(12) United States Patent
Greenwood et al.

(10) Patent No.: US 10,644,385 B1
(45) Date of Patent: May 5, 2020

(54) WIDEBAND ANTENNA SYSTEM COMPONENTS IN ROTARY AIRCRAFT ROTORS

(71) Applicant: L3 Technologies Inc., New York, NY (US)

(72) Inventors: Kenneth C. Greenwood, Salt Lake City, UT (US); Randall Trent, Holladay, UT (US)

(73) Assignee: L3Harris Technologies, Inc., Melbourne, FL (US)

( * ) Notice: Subject to any disclaimer, the term of this patent is extended or adjusted under 35 U.S.C. 154(b) by 0 days.

(21) Appl. No.: 16/353,460

(22) Filed: Mar. 14, 2019

(51) Int. Cl.
| | |
|---|---|
| *B64C 11/00* | (2006.01) |
| *H04B 7/185* | (2006.01) |
| *H01Q 1/28* | (2006.01) |
| *B64C 27/08* | (2006.01) |
| *H01Q 3/32* | (2006.01) |
| *H01Q 21/06* | (2006.01) |
| *B64C 27/473* | (2006.01) |

(52) U.S. Cl.
CPC ............ *H01Q 1/283* (2013.01); *B64C 27/08* (2013.01); *B64C 27/473* (2013.01); *H01Q 3/32* (2013.01); *H01Q 21/064* (2013.01); *H04B 7/18506* (2013.01)

(58) Field of Classification Search
CPC ..... B64C 11/00; B64C 1/36; B64C 2201/108; H01Q 1/28; H01Q 1/283; H01Q 1/44; H01Q 25/00; H01Q 25/005; H01Q 3/02; H04B 7/18506
USPC .................................................. 343/708, 705
See application file for complete search history.

(56) References Cited

U.S. PATENT DOCUMENTS

| | | | |
|---|---|---|---|
| 5,745,081 A | * | 4/1998 | Brown ..................... H01Q 1/28 343/705 |
| 2015/0118046 A1 | * | 4/2015 | Mendez Hernandez .................... H02G 13/00 416/1 |
| 2018/0097282 A1 | * | 4/2018 | Lee .......................... H01Q 1/08 |

* cited by examiner

*Primary Examiner* — Philip Sobutka
(74) *Attorney, Agent, or Firm* — Workman Nydegger

(57) ABSTRACT

Improved designs for an antenna system that facilitates narrowband and wideband radio frequency (RF) communications in a rotary aircraft are disclosed. The antenna system includes a RF front-end and a RF back-end. The front-end includes multiple RF components structured to transmit or receive RF communications as electromagnetic waves into three-dimensional space. These RF components form parts of at least one of the aircraft's rotor blades. Moreover, some of the RF components are of differing types, thereby causing the rotor blade to include multiple different types of RF components. The back-end, on the other hand, is located at a position other than the rotor blades and is connected with the front-end via the aircraft's rotary hub, which is connected to the rotor blades.

19 Claims, 15 Drawing Sheets

WIDEBAND ANTENNA SYSTEM COMPONENTS IN ROTARY AIRCRAFT ROTORS

BACKGROUND

A rotary aircraft, rotorcraft, or rotary-wing aircraft is a type of machine that flies through the air using lift generated by rotor blades. Examples of rotary aircrafts include, but are not limited to, helicopters, unmanned aerial vehicles (UAVs), small UAVs (sUAVs), unmanned aircraft systems (UAS or sUAS), and tiltwings/tilt-rotor aircraft. Rotary aircrafts are used for military purposes, commercial purposes, and recreational purposes.

Rotary aircraft have one or more central hubs and any number of rotor blades (typically between two and seven) protruding from those central hubs. Similar to a conventional airplane's wings, the shape of the blades is designed to provide a lifting force when those blades are rotated sufficiently while centered on a central hub. Rotary aircraft can also be equipped with an antenna system for transmitting and/or receiving radio frequency ("RF") communications. These RF communications may be transmitted to, or received from, any number of different external targets, endpoints, wireless network nodes, or systems. As an example, some rotary aircrafts can communicate with ground-based transmitters/receivers, with other flying machines (e.g., airplanes, unmanned aerial vehicles ("UAV"), other rotary aircraft, launched munitions, etc.), and even with satellites in orbit above the earth.

RF communications have advanced significantly in recent years. Now, more than ever before, a rotary aircraft is able to establish (in many cases even simultaneously) different RF communication links with external transmitters and receivers. Such advancements have substantially improved the safety of the pilot, aircrew and passengers aboard and of the rotary aircraft itself. Because of the benefits provided by RF communications, more and more RF components (e.g., RF front-end components and RF back-end components) are being installed into the rotary aircraft. By increasing the number of RF components, the rotary aircraft will be able to establish more of the highly desired communication links though at the potential cost of increased size, weight, and power.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments relate to antenna systems, communication systems, and methods for facilitating narrow-band and/or wideband radio frequency (RF) communications by a rotary aircraft.

In some embodiments, an antenna system is integrated or provided within a rotary aircraft, which includes at least one central rotary hub and multiple rotor blades connected to the central rotary hub. This antenna system includes a RF front-end and a RF back-end. The RF front-end includes multiple different RF components (e.g., antennas, amplifiers, mixers, tuners, waveguides, wires, etc.) that are structured to receive and/or transmit wideband RF communications as electromagnetic waves travelling within three-dimensional space. The RF components form parts of at least one of the rotary aircraft's rotor blades (e.g., by being embedded within the rotor blades). Additionally, at least some of these RF components are of differing types (e.g., antennas are different from amplifiers, amplifiers are different from mixers, and so on). Consequently, the blades are enhanced because they include multiple different types of RF components. The RF back-end, on the other hand, is located elsewhere and is connected to the RF front-end via the central rotary hub.

In some embodiments, a rotary aircraft's communications system includes a RF front-end and a RF back-end. The RF front-end includes multiple antenna arrays and multiple amplifiers. Each antenna array includes multiple antenna elements of the same configuration or, alternatively, of varied configurations for optimized performance. A first set of antenna elements and amplifiers are embedded within an internal portion of a first rotor blade of the rotary aircraft. Similarly, a second set of antenna elements and amplifiers are embedded within an internal portion of a second rotor blade (e.g., some RF components are embedded within the blade while other components like antenna elements are embedded conformally to an outer portion of the blade). The RF back-end is connected to the RF front-end via the central rotary hub. Additionally, the RF back-end is structured to at least convert digital signals to analog signals, or vice versa.

Some embodiments are directed to a method for simultaneously propagating multiple different RF signals to multiple different target endpoints. Initially, a RF back-end simultaneously feeds multiple different signals to either all or to different antenna arrays that are embedded within the rotor blades of a rotary aircraft. The antenna array(s) is structured so that its emitted beam is steered at a corresponding different target endpoint. The multiple different signals are converted, either at the RF back-end or at the RF front-end, from one or more intermediate frequencies ("IF") to one or more radio frequencies. Subsequently, each of the converted RF signals is steered or directed to its corresponding target endpoint. By doing so, multiple different RF signals are simultaneously propagated to multiple different target endpoints. Furthermore, these RF signals are initially propagated into three-dimensional space towards the multiple different targets from the rotary aircraft's rotor blades. These operations include the need to meet FAA requirements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 6 also shows how at least some of the RF components can be shaped to conform to a shape of the rotor blade.

DETAILED DESCRIPTION

Figure 1:
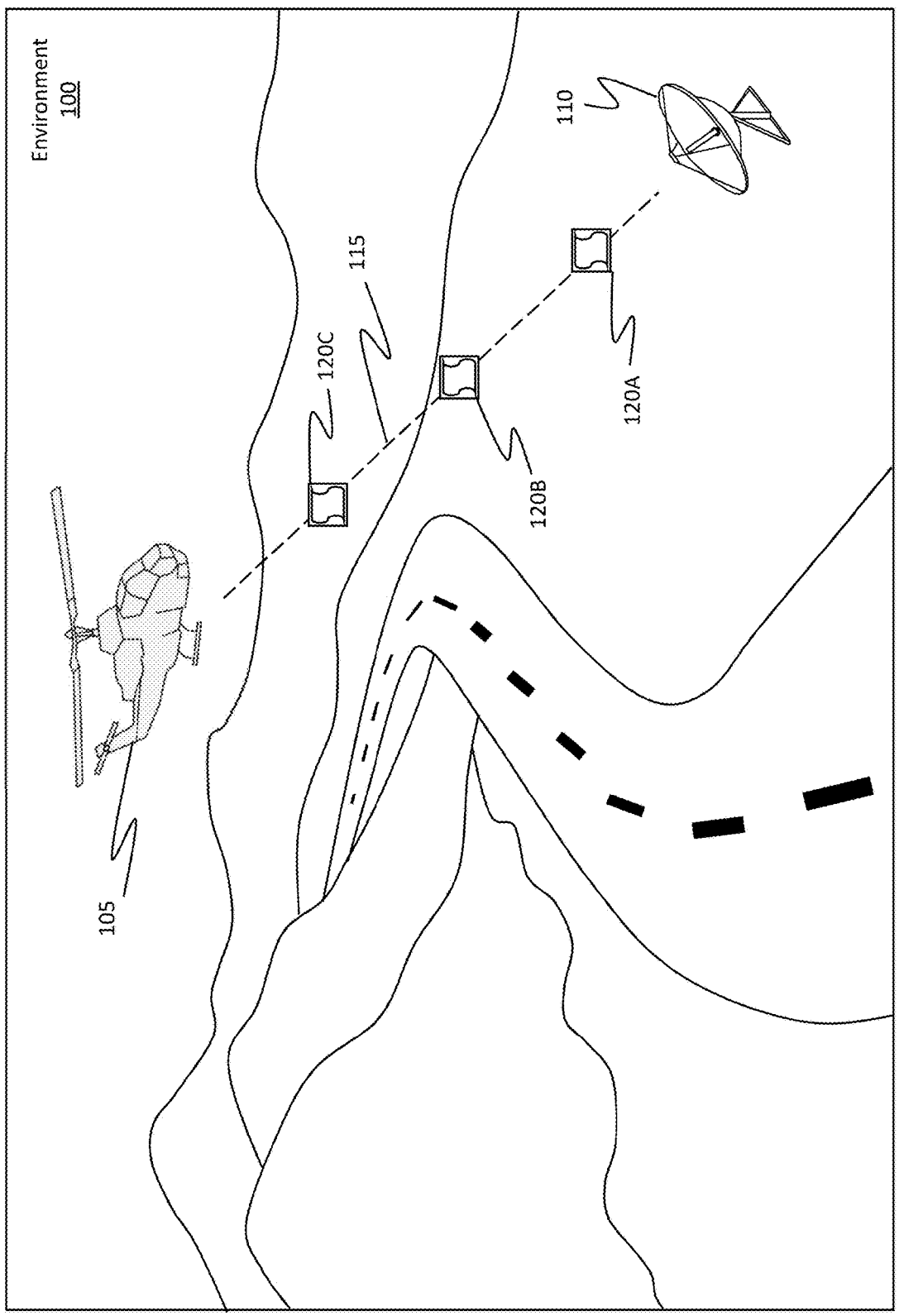
FIG. 1 illustrates an example scenario in which a rotary aircraft has established a RF communication link with a ground-based receiver or transmitter.

Disclosed embodiments relate to antenna systems, communication systems, and methods for facilitating narrowband and/or wideband radio frequency (RF) communications in a rotary aircraft. The disclosed embodiments are operable in accordance with any government specification, including DoD or FAA requirements, any commercial use, and/or any other type of public use.

In some embodiments, an antenna system's RF front-end is included as a part of one or more rotor blades of a rotary aircraft. Because the front-end includes differing types of RF components, the rotor blades also include differing types of RF components. The RF back-end, on the other hand, is located elsewhere and is connected to the RF front-end via the rotary aircraft's central rotary hub.

In some embodiments, a communication system's RF front-end includes multiple antenna arrays (each of which includes one or more antenna elements) and multiple amplifiers. A first set of antenna elements and amplifiers are embedded inside a first rotor blade of a rotary aircraft while a second set of antenna elements and amplifiers are embedded inside a second rotor blade of the rotary aircraft. The communication system's RF back-end is connected to the RF front-end via the rotary aircraft's central rotary hub. This RF back-end at least converts digital signals to analog signals, or vice-versa.

In some embodiments, a method is provided to simultaneously propagate multiple different RF signals to multiple different target endpoints. In doing so, a RF back-end simultaneously feeds multiple different signals to different (or all) antenna arrays that are embedded within different rotor blades and that form parts of a RF front-end. The different signals are also converted, either at the RF front-end or the RF back-end, from an intermediate frequency to a radio frequency. Subsequently, each one (or all) of the different antenna arrays directs its corresponding converted RF signal to its corresponding target endpoint, thereby resulting in multiple different RF signals being simultaneously propagated to multiple different target endpoints.

Technical Benefits

One problem aircraft and RF system designers are facing is that of limited aircraft real-estate (i.e. adequate surface area for antenna apertures and proper separation of the apertures that reduce or remove local interference). In fact, rotary aircrafts are now so packed with different types of hardware (including RF communication systems) that these aircrafts are running out of room for any additional hardware. Notwithstanding this shortage and in conflict with the area and hardware room limitations, it is becoming increasingly more important to provide as many RF communication links as possible. Consequently, there is a substantial need to improve how RF communications systems are designed in order to support the ever increasing need of providing more RF communication links for a rotary aircraft.

Yet another problem designers are facing is how to remove or reduce the blockage that occurs to RF communications when performed on a rotary aircraft. To clarify, traditional RF systems on rotary aircrafts have faced major signal interferences as a result of the overhead spinning rotor blades and interference from other parts of the aircraft's fuselage. While some techniques have been developed to address these interferences (e.g., by pulsing/bursting RF signals when a blade is not immediately overhead of the RF antennas), such techniques result in increased processing or suboptimal results (e.g., bursting the signal may result in missed data or even reduced efficiency). Consequently, there is also a substantial need to improve how RF communications are transmitted and received, especially on a rotary aircraft.

The disclosed embodiments can be used to provide solutions to these problems. For instance, by embedding different types of RF components in a rotary aircraft's rotor blades, the disclosed embodiments provide substantial improvements because they utilize previously unclaimed or untapped real-estate. By so doing, the disclosed embodiments can substantially increase the number of RF communication links that the aircraft may establish.

As discussed earlier, the amount of real-estate on a rotary aircraft is quite limited. Furthermore, it is highly desirable to increase the number of communication links. Recognizing the limited real-estate, the disclosed embodiments capitalize on the real-estate that is available, namely, the aircraft's rotor blades. Whereas previously the rotor blades were an untapped resource with regard to wideband RF communications, the disclosed embodiments provide much-needed improvements to the technology by utilizing the rotor blades in a unique and highly advantageous manner.

By placing RF components overhead of the fuselage (e.g., in the rotor blades), the disclosed embodiments significantly (or entirely) eliminate overhead interferences that previously impeded upward-directed RF transmissions. In this regard, improved overhead RF transmissions may be achieved. Additionally, the disclosed embodiments can now send transmissions continuously as opposed to periodically.

The disclosed embodiments also improve the technology by providing essentially a zero net weight gain to the rotary aircraft while substantially increasing the number of RF components (and therefore the number of links). That is, by manufacturing the rotor blades in accordance with the disclosed techniques (e.g., by embedding RF components inside of the rotor blades), the embodiments substantially increase the aircraft's number of RF components while providing essentially zero weight gain. Stated differently, the added weight of the new RF components is mitigated by the removal of material from the rotor blades (e.g., to make room for the RF components). Accordingly, the disclosed embodiments provide significant and substantial improvements to a rotary aircraft's antenna system by providing an increased number of additional links off of a single platform.

RF Communication Links

Attention will now be directed to FIG. 1, which shows an example environment 100 in which a rotary aircraft 105 and a ground-based transmitter/receiver 110 have established a RF communication link 115 with one another. As a result of this RF communication link 115, the rotary aircraft 105 and the ground-based transmitter/receiver 110 are able to exchange (e.g., transmit and receive) information (e.g., data packet 120A, data packet 120B, and data packet 120C) back and forth to one another.

According to the disclosed embodiments, the rotary aircraft 105 is able to transmit and receive any type of data packet. For example, in some situations, the data packets 120A-C include lower bandwidth voice data, higher bandwidth video data, or any other type of wideband data or signal. As such, rotary aircraft 105 is able to transmit and/or receive any type of wideband RF communication.

Figure 2:
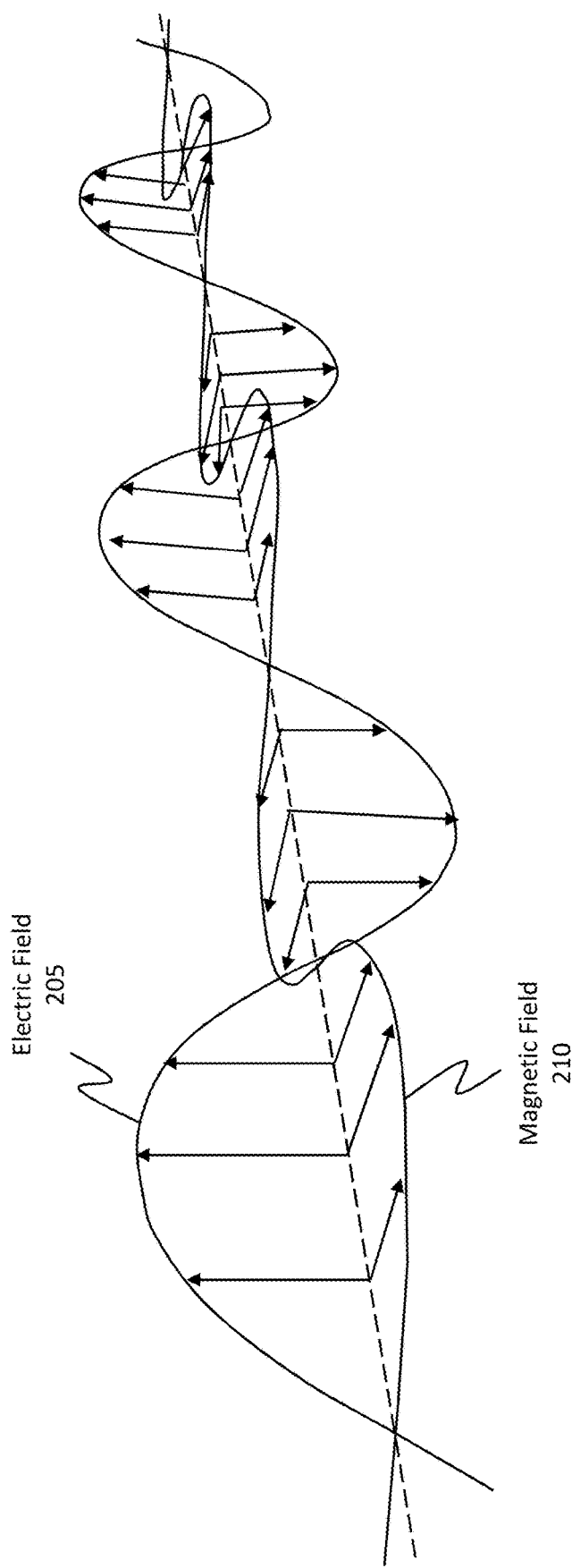
FIG. 2 illustrates how an electromagnetic wave includes both an electric field and a magnetic field.

To establish RF communication link 115, rotary aircraft 105 sends or receives an electromagnetic wave to the ground-based transmitter/receiver 110. FIG. 2 shows an example electromagnetic wave 200, representative of both a narrowband and a wideband signal. Electromagnetic wave 200 includes an electric field 205 and a magnetic field 210. Electromagnetic wave 200 may be launched by an antenna, and it may also be intercepted, or rather received by, the antenna.

Figure 3:
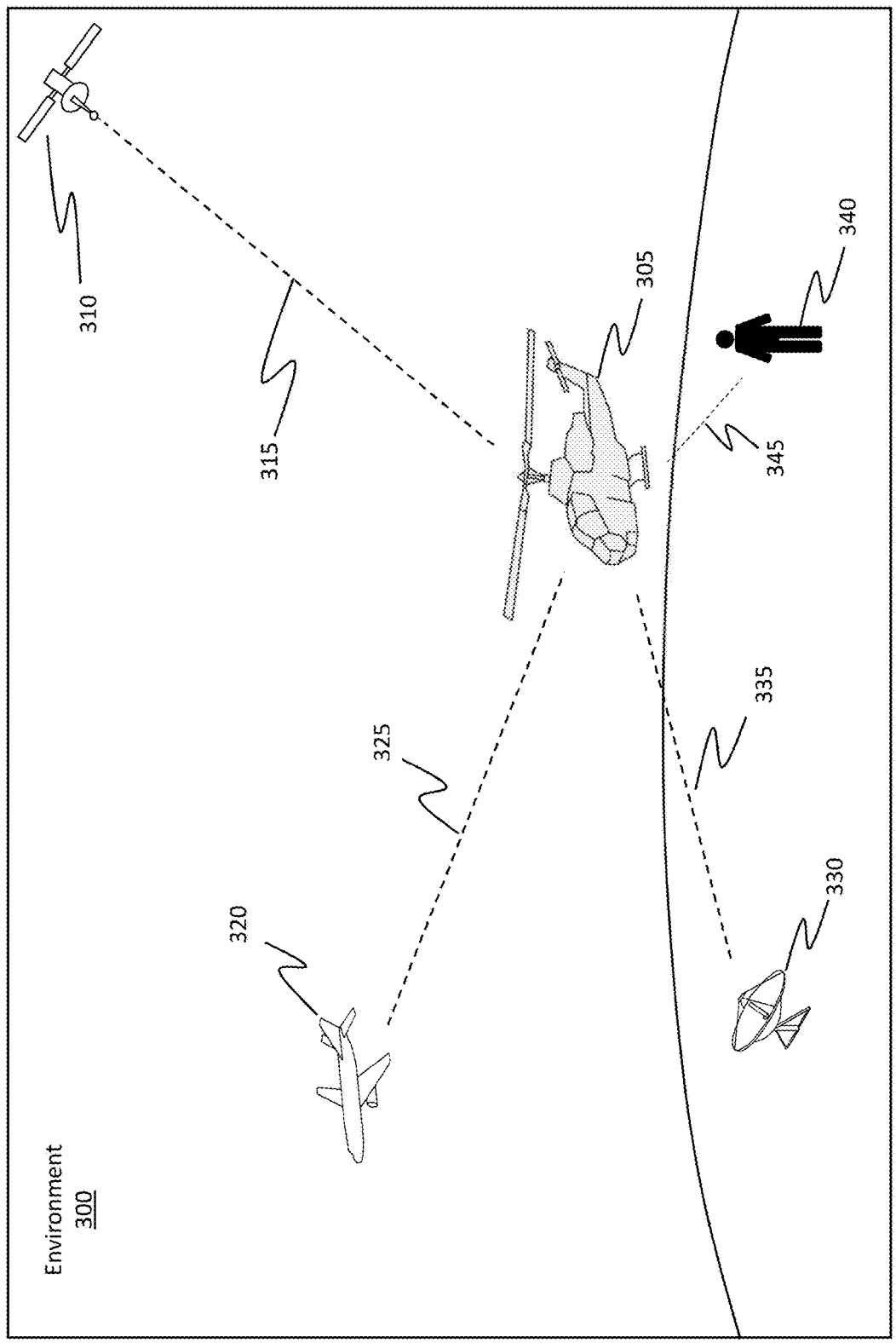
FIG. 3 illustrates an example scenario in which a rotary aircraft has established multiple different RF communication links with multiple different receivers/transmitters, including a ground-based dish, troops on the move, a flying airplane, and a satellite in space.

FIG. 3 shows another example environment 300, which is somewhat similar to environment 100 of FIG. 1. In environment 300, however, rotary aircraft 305, which is representative of rotary aircraft 105 from FIG. 1, has established multiple simultaneous RF communication links with multiple different external entities through use of its RF components (e.g., antennas, amplifiers, mixers, tuning mechanisms, waveguides, wires, etc.).

To illustrate, rotary aircraft 305 is currently communicating with an orbital satellite 310 via RF communication link 315. Rotary aircraft 305 is also currently communicating with an airplane 320 via RF communication link 325. Finally, rotary aircraft 305 is also currently communicating with a ground-based dish 330 via RF communication link 335 and also with ground troops 340 (at halt or on the move) via RF communication link 345. Ground troops 340 should be interpreted broadly to include troops and/or vehicles, on the move or stationary. It will be appreciated that rotary aircraft 305 is able to establish any number of RF communication links, where the only limitation on this number is based on the number of available RF components.

Rotary Aircrafts

Figure 4:
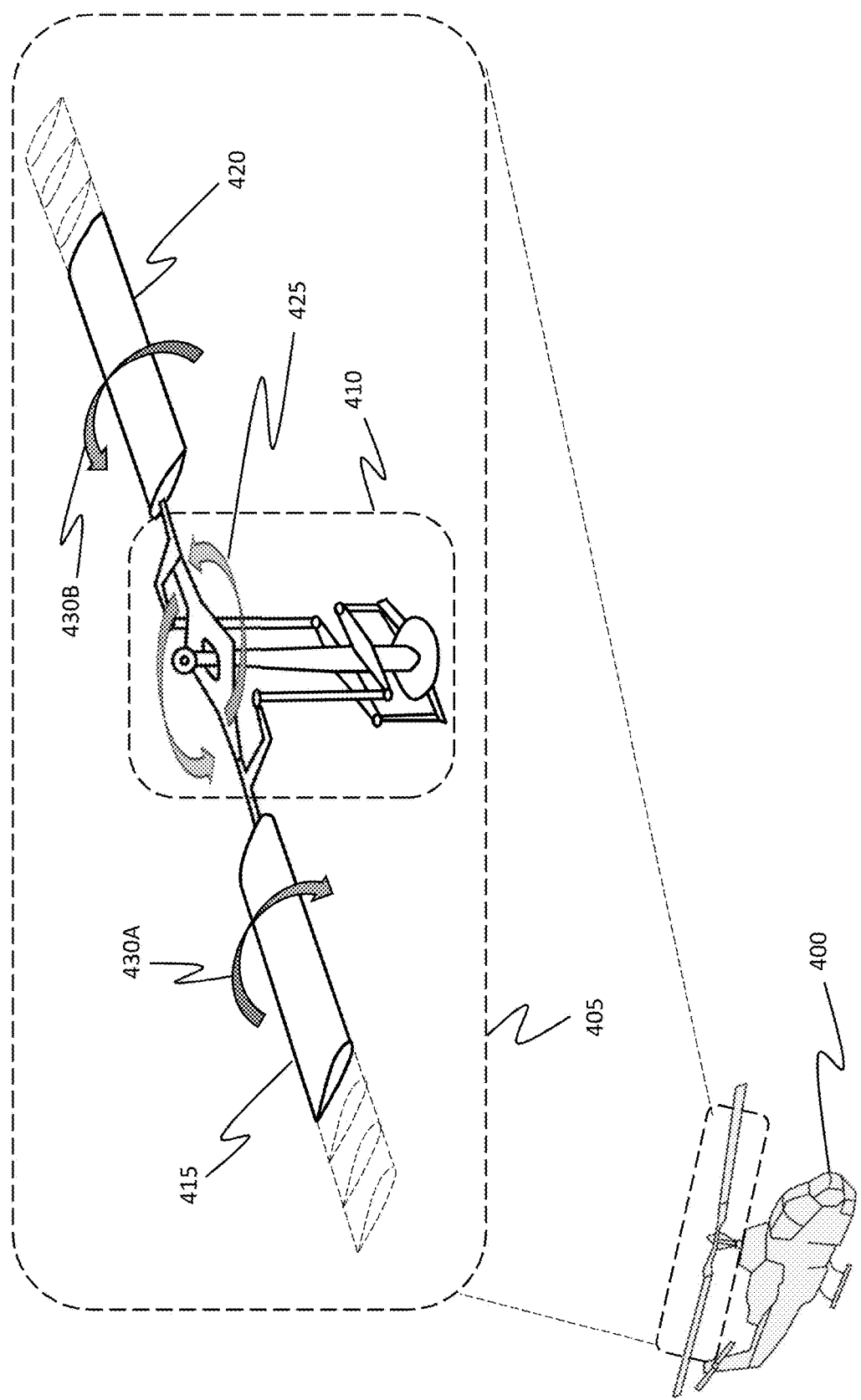
FIG. 4 illustrates a central rotary hub and rotor blades, the combination of which enable a rotary aircraft to fly.

FIG. 4 shows a rotary aircraft 400, which is representative of rotary aircraft 305 from FIG. 3. Here, a blown-up view 405 of rotary aircraft 400's central rotary hub 410 and rotor blades 415 and 420 is shown. Rotor blades 415 and 420 are each connected to the central rotary hub 410, which is attached to a drive shaft (not shown). The drive shaft is attached to a transmission (also not shown) which is attached to the rotary aircraft's engine. Although only two rotor blades 415 and 420 are illustrated, rotary aircraft 400 may include any number of rotor blades, with typical numbers being between two and seven.

As indicated by arrows 425, rotor blades 415 and 420 rotate/spin about the central rotary hub 410. The rotation rate can be any rate, but typical rates are around 200 Hz. The arrows 430A and 430B show how the central rotary hub 410 is able to adjust the tipping angle of blades 415 and 420. That is, the flight control of rotary aircraft 400 is based on tipping the rotor blades 415 and 420 backward and forward.

Although rotary aircraft 400 is in the form of a helicopter, the disclosed embodiments may be implemented in any type of rotary aircraft (e.g., drones, tilt-wings, etc.). Most helicopters have a fuselage, a tail boom, a main rotor, and a tail rotor. The tail rotor is provided to compensate for any rotational torque caused from the rotations of the main rotor. As generally discussed earlier, most of the helicopter's fuselage and tail boom is located underneath of the rotor blade's shadow.

Traditional helicopters often place their antenna systems, which include both a RF front-end and a RF back-end, either on the top or bottom of the fuselage or tail boom. Depending on the number or the size of the blades, at any given point overhead spinning blades will block or otherwise impede these antenna systems. That is, such a configuration often causes an RF link break whenever a rotor blade passes overhead of the antenna. As such, these traditional helicopter antenna systems were required to transmit a RF signal through the rotor blade's shadow, which often resulted in the problems discussed earlier.

Embedded RF Components

To solve some of the problems with the traditional technology, the disclosed embodiments place at least some of the antenna system in the rotor blades themselves. In doing so, the problems of compensating for an overhead rotor blade shadow can be removed entirely (for upward directed RF communications). Additionally, the problems of limited real-estate are mitigated because previously un-tapped real-estate is now being used.

Figure 5:
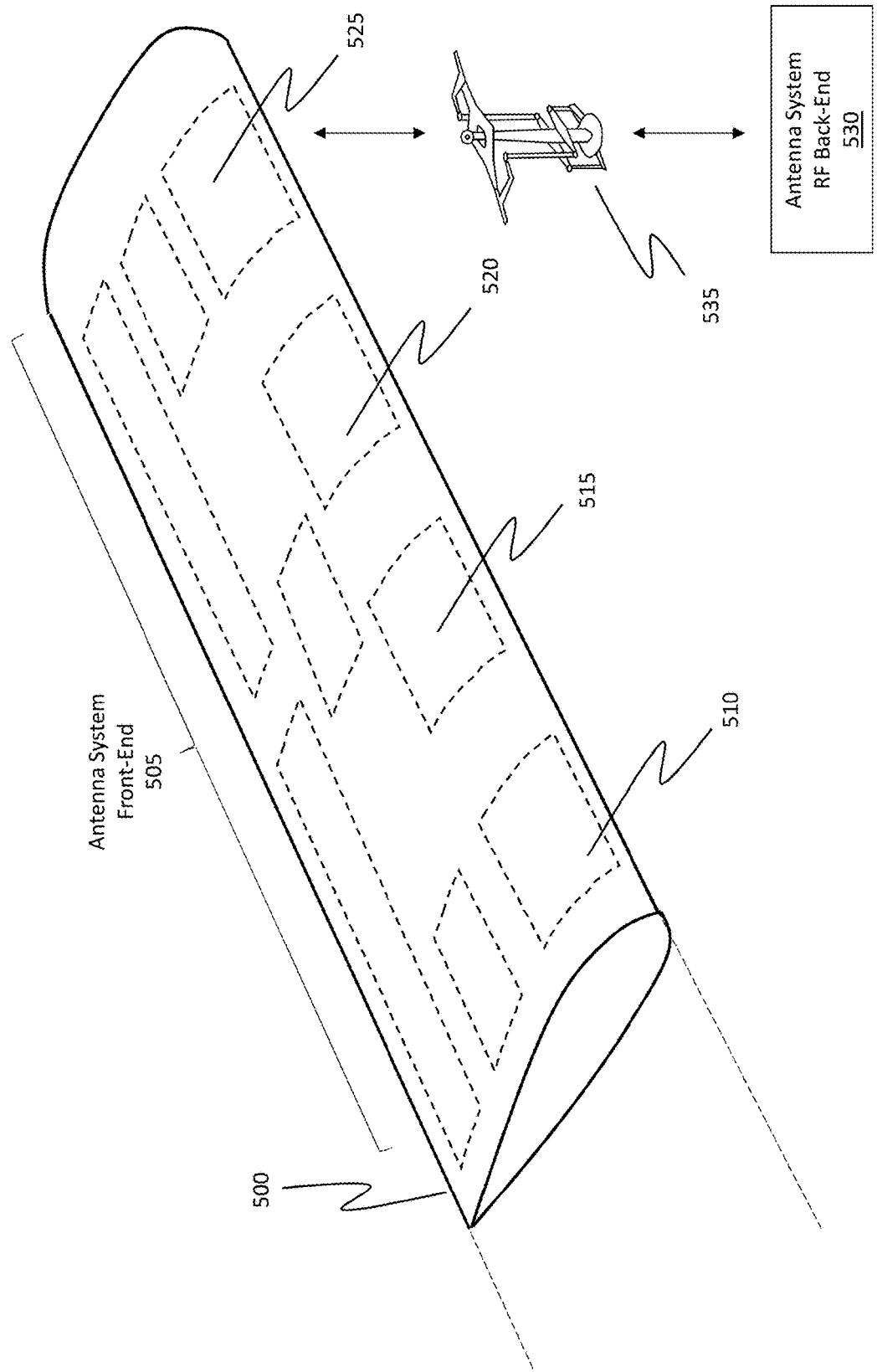
FIG. 5 shows how different types of RF components (e.g., antennas, amplifiers, mixers, tuning systems, wires, waveguides, etc.) may be included as a part of, or embedded inside of, a rotor blade.

Accordingly, FIG. 5 shows an example rotor blade 500, which is representative of the rotor blades 415 and 420 from FIG. 4. It will be appreciated that while some of the Figures show only a single rotor blade, the disclosed principles may be applied to one, some, or all of the rotor blades.

According to the disclosed embodiments, rotor blade 500 is now being used as a part of an antenna system, where the antenna system facilitates wideband radio frequency (RF) communications of a rotary aircraft. Here, the antenna system comprises a RF front-end 505 that includes any number of RF components, such as RF component 510, RF component 515, RF component 520, and RF component 525. Although only four RF components are labeled and although only eighteen RF components are illustrated in FIG. 5, it will be appreciated that any number of RF components may be included as a part of the RF front-end 505, with the only limitations being on the size or dimensions of the rotor blade 500 and on the number of available rotor blades. Note, additionally that the RF components shown in the figures are not necessarily to scale. The components may be larger or smaller, of different relative dimensions, and/or different shapes and with varied distributions than what is shown.

These RF components (e.g., RF components 510, 515, 520, and 525) are structured to transmit and/or receive any number of wideband RF communications as electromagnetic waves into three-dimensional space (e.g., wideband electromagnetic wave 200 from FIG. 2). Examples of RF components include, but are not limited to, antenna arrays (e.g., where each array includes one or more antenna elements), RF amplifiers, mixers, waveguides, wires, and even frequency tuning mechanisms. As shown in FIG. 5, the RF components actually form parts of rotor blade 500. That is, the RF components are actually embedded within an internal portion of rotor blade 500 such that the RF components are not exposed to an external environment. The RF components are illustrated using a dashed line to symbolically represent how they are embedded inside of rotor blade 500. An example technique on how to embed RF components inside of the rotor blade 500 will be presented later. In some embodiments, at least some of the RF components (e.g., antenna elements) are conformally placed on (or flush to) an outer portion of rotor blade 500. To be more precise, a portion of the RF components are embedded inside of rotor blade 500 while another portion are disposed in plane with the outer contours of rotor blase 500. As an example, consider an antenna element (e.g., a radome). To launch a signal, it is beneficial to not obstruct the propagation path of the antenna element. As such, the portion of the antenna element that launches the signal may be disposed level or in plane with the outer contour of the rotor blade 500. In this manner, the rotor blade 500 will not disrupt the signal. Remaining portions of the antenna element (if there are any) may be embedded within the rotor blade 500. As such, some RF components are embedded entirely within rotor blade 500 while other RF components may only be partially embedded and may have a portion conformally shaped to the outer contour of the rotor blade 500. In this situation, RF transparent paint or material (e.g., a type of low loss covering) may be disposed overtop of the conformally shaped portion so as to protect the portion from the external environment.

At least some of the RF components inside rotor blade 500 are of differing types. For instance, RF component 510 may be an antenna array, RF component 515 may be an RF amplifier, RF component 520 may be a mixer, and RF component 525 may be a frequency tuning mechanism. Additionally, or alternatively, RF components 510, 515, 520, and 525 may represent an integrated antenna RF front end. It will be appreciated that any antenna elements may vary in size, spacing, or tapering. The other RF components may be additional antenna arrays, amplifiers, mixers, tuning mechanisms, and/or wires or waveguides connecting the different RF components. In this regard, rotor blade 500 has a vast feed/control network embedded entirely within its internal areas. It should be noted that one of the benefits of an antenna array is that even if one portion of the array fails for some reason, the array can still operate to launch or receive signals. As such, the embodiments beneficially use antenna arrays.

The antenna system also includes a RF back-end 530 connected to the RF front-end 505 via the central rotary hub 535, which is representative of the central rotary hub 410 from FIG. 4. In cases where a mixer is included as a part of RF front-end 505, RF back-end 530 is provided to convert analog intermediate frequency ("IF") signals to digital signals (and vice-versa) that are usable with a computer system. In cases where the mixer is included as a part of RF back-end 530, then RF back-end 530 converts a RF signal to an IF signal and then converts the IF signal, which is an analog signal, to a digital signal (and vice-versa) for signal processing by a computer system. As such, RF back-end 530 may include any number of digital-to-analog converters ("DAC"), analog-to-digital converters ("ADC"), tuning mechanisms, mixers, amplifiers, and computer systems for generating or processing digital and analog signals.

The disclosed embodiments communicatively couple RF front-end 505 to RF back-end 530 via the central rotary hub 535. That is, physical wiring (and/or slip ring configurations) extends from the RF back-end 530 to an inner ring of the central rotary hub 535. The central rotary hub 535 also includes an outer ring connected to the rotor blades (e.g., rotor blade 500), where the outer ring is communicatively coupled to the RF components in the blades. A brush is provided within the central rotary hub 535 to connect the inner and outer rings to one another. Consequently, RF back-end 530 is continuously coupled to RF front-end 505.

Figure 6:
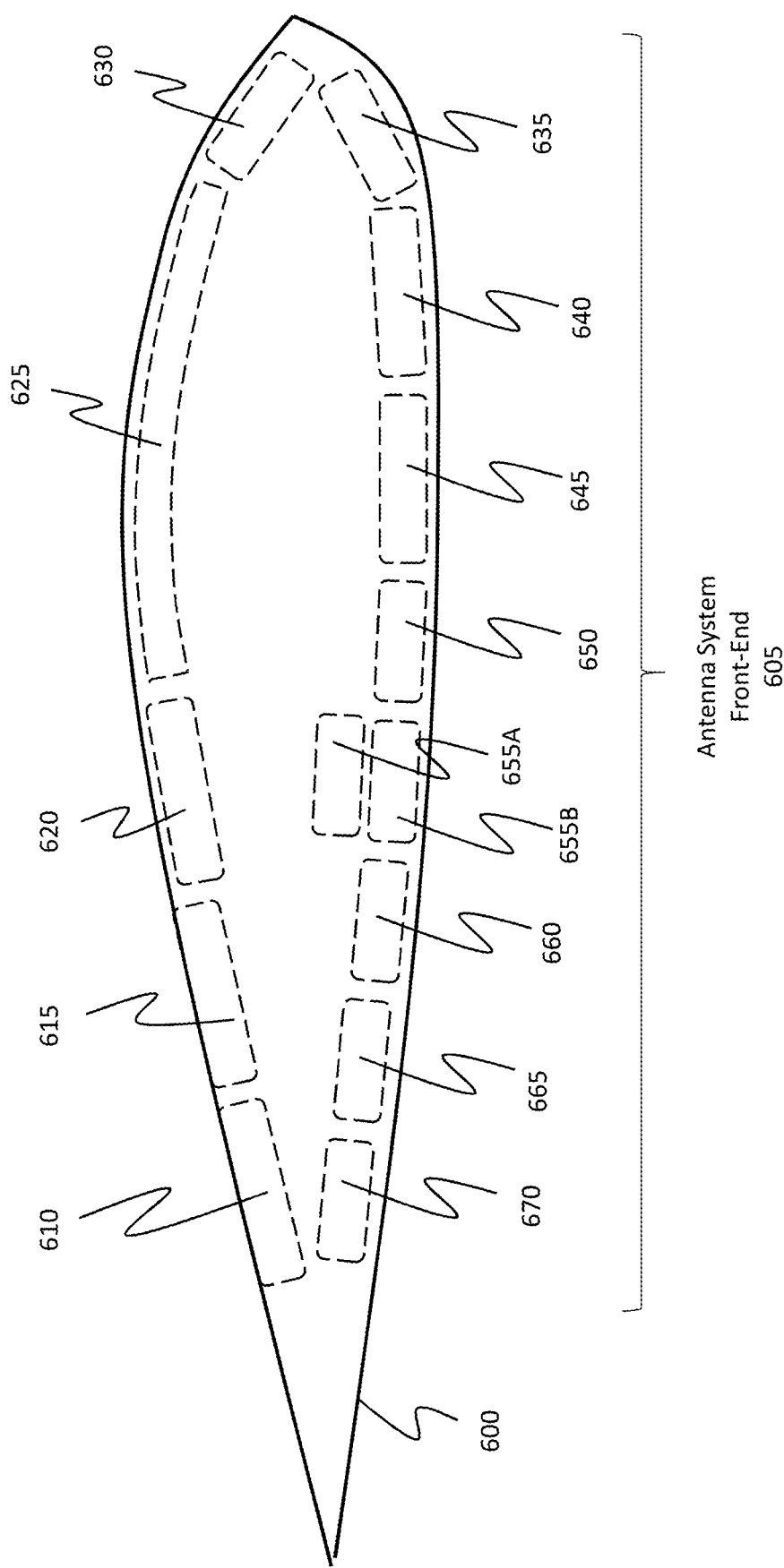
FIG. 6 shows a side profile view of an example rotor blade and how the different types of RF components may be embedded within the rotor blade.

FIG. 6 shows a side profile view of an example rotor blade 600, which is representative of rotor blade 500 from FIG. 5. Similar to the structure of rotor blade 500, the RF front-end 605 is embedded inside rotor blade 600. Furthermore, rotor blade 600 may include any number of RF components, such as, but not limited to, RF components 610, 615, 620, 625, 630, 635, 640, 645, 650, 655A, 655B, 660, 665, and 670. Again, differing types of RF components are embedded within the internal portion of rotor blade 600. Note that the RF components are not necessarily to scale. Also note, that in some embodiments, the components may be embedded into to the blade 600 by disposing the RF components on the surface of the blade, and then conformally coating the blade to encapsulate the RF components. The differing types include, but are not limited to, (1) one or more antenna arrays (e.g., where each array includes one or more corresponding antenna elements configured to propagate an electromagnetic signal), (2) one or more RF amplifiers configured to amplify a received signal, (3) one or more mixers configured to convert RF signals to intermediate frequency (IF) signals and IF signals to RF signals, (4) one or more waveguides, (5) one or more wires, or (6) one or more tuners.

In some embodiments, rotor blade 600 includes only one type of antenna array while in other embodiments it includes multiple different types of antenna arrays. Example array types include, but are not limited to, tapered Vivaldi antenna arrays, fractal antennas, staggered patch antenna arrays, or linear circular polarization (CP) antenna arrays. Briefly, a Vivaldi antenna array is a type of tapered slot antenna which includes co-planar broadband elements. A staggered patch antenna array is a type of low profile antenna that can be mounted on a relatively flat surface. A linear circular polarization antenna array produces a linearly polarized signal that oscillates, either horizontally or vertically, in a particular plane while traveling through three-dimensional space.

In some embodiments, multiple RF components may be stacked one on top of the other inside of rotor blade 600. For instance, RF component 655A is shown as being on top of RF component 655B. In some embodiments, the RF components may also be shaped to conform to a general shape of the rotor blade 600. To illustrate, RF component 625 is shown as having a bend that generally follows the curvature of the rotor blade 600.

FIG. 6 also shows that a first set of the RF components (e.g., RF components 610, 615, 620, 625, and 630) are physically disposed near/proximate to an upper surface (i.e. the dorsal surface) of the blade 600. A second set of RF components (e.g., RF components 635, 640, 645, 650, 655B, 660, 665, and 670) are physically disposed near/proximate to a bottom surface (i.e. a ventral surface) of the blade 600, where the ventral surface is an opposing surface to the dorsal surface. RF components 610 and 615 are specifically positioned flush to (or conformally with) the outer portion of rotor blade 600. Here, an RF transparent coating may be disposed over top of RF components 610 and 615 to act as a protective layer. In some embodiments, RF components 610 and 615 are antenna elements and they are positioned conformally to the outer contour of the rotor blade 600 so that they can launch a signal without interference from the rotor blade 600. In some embodiments, as will be discussed in more detail later, the first set of RF components are controlled simultaneously to, and independently from the second set of RF components. As an example, the first set of RF components may transmit a first electromagnetic wave in an upward direction relative to the rotary aircraft while the second set of RF components may simultaneously transmit a second electromagnetic wave in a downward direction relative to the rotary aircraft. From FIG. 6, it will be appreciated that the antenna system front-end 605 may include any kind of active and/or passive circuitry or other hardware used to transmit and receive signals. In some embodiments, the RF components embedded within rotor blade 600 may be positioned in a honeycomb-like manner to protect the RF components from jarring or other disturbances. A shock absorption gel may be included within the rotor blade 600 to absorb shock, where the shock absorption gel is at least partially wrapped around the RF components.

By embedding RF components in rotor blades, additional RF links can be formed off of a single platform. Furthermore, by embedding RF components inside of rotor blade 600, the RF components will not impede the aerodynamic performance of the rotor blade 600.

A technique for embedding RF components inside of rotor blade 600 will now be disclosed. Initially, it is noted that today, rotor blades (e.g., rotor blade 600) are typically made of composite materials. Example materials include, but are not limited to, aluminum, carbon fiber, Kevlar, fiberglass, or any other type of composite material. It is also noted that a rotor blade includes a central core. From this central core, traditional blades are progressively built up, layer upon layer, until the blades are fully formed.

According to the disclosed technique, when a new layer is added to the core, the new layer is shaped to create compartments, chambers, spaces, recessed areas, or other types of shapes that conform, or rather that will accommodate, a specific RF component selected to be placed at that shaped location. As such, the internal portions of a rotor blade are progressively shaped to accommodate the different RF components. These shaping processes allow RF components to be embedded inside of the rotor blade while the rotor blade is being manufactured. That is, because rotor blades are closed bodies, RF components are embedded inside of the rotor blades during the layering process.

Accordingly, RF components, which include any type of antenna elements/arrays, amplifiers, mixers, tuners, wires, and waveguides, may be added to, or rather embedded within, a rotor blade while the rotor blade is being manufactured. Such a process produces a rotor blade that appears to be unmodified from the outside (i.e. the external appearance of the rotor blade remains substantially unchanged) but that is actually enhanced because of the embedded RF components.

In some embodiments, two, three, four, or any number of RF components may be stacked on top of one another, as shown by RF components 655A and 655B in FIG. 6. Such stacking allows for improved performance in achieving very wideband signals. Additionally, or alternatively, some of the RF components may be tapered in order to mitigate any kind of satellite interference on the side lobes of the antennas' radiation patterns, which will be discussed in more detail later.

For antenna arrays embedded within rotor blade 600, any type of desired antenna aperture may also be achieved. That is, the antenna elements can be arranged/placed within the internal portions of the rotor blade in order to achieve equivalent performance of any type of antenna aperture (including typical non-array configurations). Such arrangements, as will be discussed later, enable each antenna array's beam to be carefully aimed, steered, pointed, or tracked, or even each individual antenna element's beam to be aimed, where the aiming takes into account the rotation of the blades (to be discussed in more detail later).

The embedded RF components may include very low profile antenna arrays which can be conformal so as to fit inside any sized rotor blade. The RF components can also include amplifiers that can provide enough RF power and be physically robust enough so as to withstand being embedded within a spinning rotor blade. Even low noise amplifiers ("LNA") on an antenna receiver can be embedded within the rotor blades.

As such, amplifiers can be placed proximate to antenna arrays in order to achieve an improved signal to noise ratio ("SNR"). The embedded RF components can also include any type of tuning mechanism, which matches impedances, or mixer, which performs RF to IF conversion and IF to RF conversion. As such, the RF/IF or IF/RF conversion may be performed directly within a rotor blade. Alternatively, the RF/IF or IF/RF conversion can be performed outside of the rotor blade, if so desired. In some embodiments, determining where to perform the RF/IF and IF/RF conversion is dependent on the functionality and characteristics of the central rotary hub's connection and whether that connection will result in too much loss or introduce too much noise.

Example Antenna Patterns

Figure 7A:
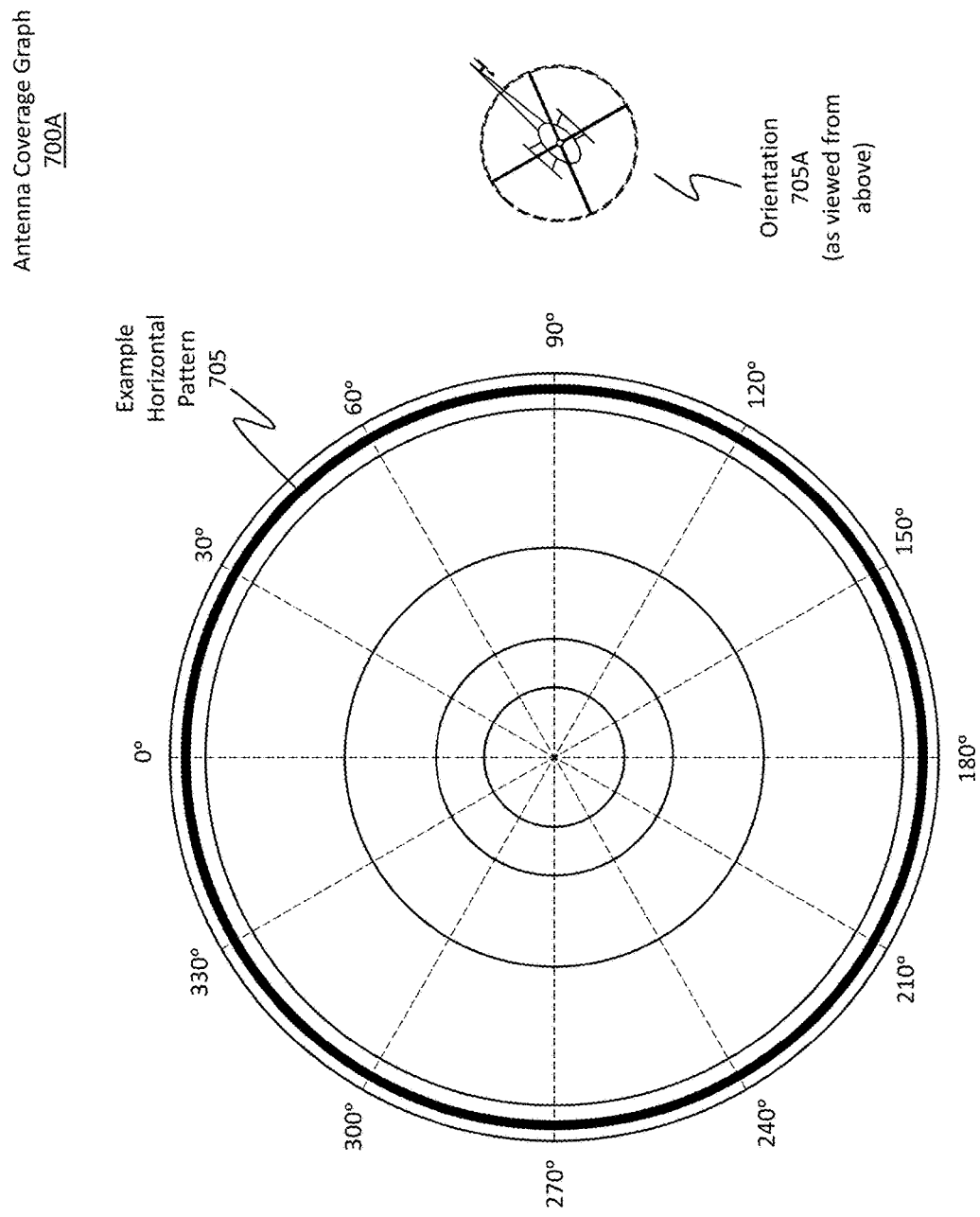
FIGS. 7A and 7B respectively show a non-limiting example of a horizontal antenna pattern and a vertical, or elevation plane, pattern.
Figure 7B:
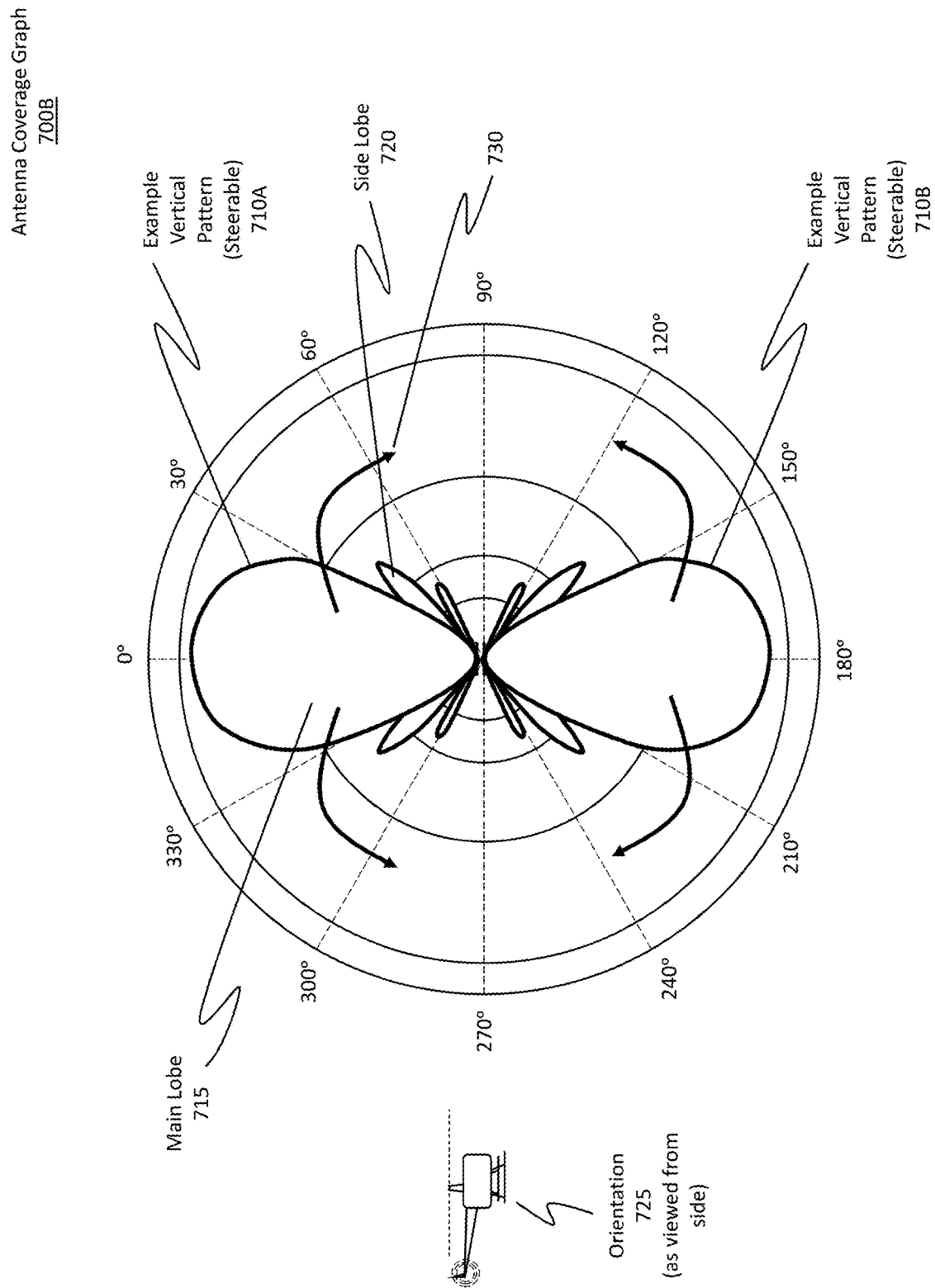

Attention will now be directed to FIGS. 7A and 7B. These figures show some non-limiting example antenna radiation patterns. It will be appreciated that these patterns are for example purposes only and should not be considered binding or otherwise limiting. In a later section, disclosure will be provided to demonstrate how the antenna array beams can be electronically steered in order to lock on to an external transmitter or receiver.

FIG. 7A shows an antenna coverage graph 700A showing an example horizontal pattern 705. That is, suppose a rotary aircraft's rotor blades are equipped with the disclosed RF components. If viewed from above (i.e. top looking down view as shown by orientation 705A), then the antenna arrays embedded in the aircraft's rotor blades may emit an electromagnetic field following an azimuthal radiation pattern as shown by the example horizontal pattern 705.

Similarly, FIG. 7B shows a related antenna coverage graph 700B, but this antenna coverage graph 700B is from an elevation plane view (i.e. from the side looking horizontally toward the rotary aircraft). FIG. 7B shows an example vertical pattern (steerable) 710A, which is radiating upwards, and an example vertical pattern (steerable) 710B, which is radiating downwards. The disclosed embodiments may generate 1, 2, 3, 4, 5, 6, 7 (or any number) separate, steerable antenna patterns as a result of a first set of RF components being embedded near a dorsal surface of a rotor blade and a second set of RF components being embedded near a ventral surface of the rotor blade.

That is, the first set can be aimed upwards and the second set can be aimed downwards. As will be described in more detail later, the antenna elements included among the first set can all operate uniformly, thereby acting as a single antenna unit, or they can all operate individually, thereby acting as many antenna units. Such diversity allows for an increased number of RF communication links to be formed. A similar approach is available for the second set of RF components.

As an example, consider a scenario where a rotor blade includes 8 antenna elements disposed upon or in the rotor blade's dorsal surface and another 8 antenna elements disposed upon or in the rotor blade's ventral surface. Here, the top 8 antenna elements may all operate in unison, thereby acting as a single antenna unit. Similarly, the bottom 8 antenna elements may all operate in unison. In a situation where the top 8 antenna elements operated in unison with one another and the bottom 8 antenna elements operated in unison with one another, only two RF communication links would be formed. Having a larger number of antenna elements operating together allows for multiple RF communications (both narrowband and wideband). In other situations, the 16 antenna elements may all operate independently from one another, such that 16 potential RF communication links may be formed.

FIG. 7B also shows a main lobe 715 and an example side lobe 720, where the orientation 725 indicates that the orientation is positioned as being viewed from the side. As will be discussed later, the disclosed embodiments are able to perform any kind of low probability of detection ("LPD") steering, low probability of intercept ("LPI") steering, anti-jamming, satellite interference, and even geo-steering. Such steering techniques adjust the range and strength of the main lobe 715 and the side lobe 720. The arrow 730 demonstrates how the lobes are steerable.

Because the disclosed embodiments provide a highly diverse antenna architecture, they can support multiple different frequency bands (i.e. wideband). That is, multi-band RF communication may be performed. Examples of some of the supported frequency bands/ranges include, but are not limited to, the L-band, the S-band, the C-band, the X-band, the Ku-band, the K-band, the Ka-band, or higher than 40 GHz up to 90 GHz. In this regard, the disclosed embodiments are operable in frequencies between at least 500 MHz and 90 GHz. For reference, the L-band includes wavelengths having frequencies between 1-2 GHz. The S-band includes wavelengths having frequencies between 2-4 GHz. The C-band includes wavelengths having frequencies between 4-8 GHz. The X-band includes wavelengths having frequencies between 8-12 GHz. The Ku-band includes wavelengths having frequencies between 12-18 GHz. The K-band includes wavelengths having frequencies between 18-27 GHz. The Ka-band includes wavelengths having frequencies between 27-40 GHz.

Electronic Steering

As generally described earlier, the disclosed embodiments are able to electronically "steer" or "aim" any varying combinations of antenna elements embedded in the rotor blades. As an example, suppose a helicopter has four rotor blades, and each blade has 16 top antenna elements and 16 bottom antenna elements, resulting in the helicopter having an additional 128 antenna elements (e.g., 16×2×4) available to establish RF communication links. Each antenna element can be electronically biased independently of the other antenna elements or, alternatively, each antenna element can be caused to operate as coordinated antenna arrays with 1, 2, 3, 4, 5, 6, 7, 8, 9, 10 or any number of other antenna elements. Antenna elements on one rotor blade can also operate in conjunction with antenna elements on another rotor blade for improved array performance (e.g., increased gain, more precise beam steering, etc.). It should be noted that a beam is steered using multiple antenna elements. Further, as will be described herein, a single rotor blade can be structured to support multiple RF links. The disclosed embodiments are also operable to support waveform generation and modem functions.

As an example, the 16 top antenna elements of one rotor blade can operate jointly with the 16 top antenna elements of another rotor blade. In some situations, all 64 top antenna elements can operate in unison with one another, thereby providing the opportunity to establish multiple RF communication links (both narrowband and wideband) while also increasing antenna efficiency and antenna gain. Accordingly, a robust network is provided to steer any number or combination of antenna elements in the rotor blades.

Individual antenna elements, or even smaller clusters or groups of antenna elements, may be formed and can be used to perform command and control ("C2") type communications because only a relatively low bandwidth is required for such communications. To get higher bandwidth communications (e.g., video data), then it is beneficial to merge or combine numerous antenna elements together to operate in unison. Such a combination produces a larger antenna aperture, which also provides for increased antenna efficiencies and antenna gains. These larger efficiencies and gains make it possible to transmit and receive the higher bandwidth signals (e.g., video). Consequently, by combining antenna elements to operate in unison, it is possible to get larger gains and efficiency measurements via the representative larger area's aperture.

Accordingly, the antenna's aperture can be dynamically adjusted in real-time and on an as-needed basis. In particular, the disclosed embodiments are able to identify an antenna system's "equivalent isotropically radiated power" ("EIRP"), which refers to the product of an antenna's transmitter power and the antenna's gain (for a given direction) relative to a transmitter's isotropic antenna. Using this EIRP, the aperture can be dynamically adjusted to ensure that an endpoint (e.g., a satellite, plane, etc.) can be properly reached with the propagated signal. Furthermore, the EIRP can be used to ensure that the signal-to-noise ratio or gain-to-noise-temperature ratio (G/T) is adequate (e.g., where "G" is the antenna gain in decibels and the receive frequency, and "T" is the equivalent noise temperature of the receiving system in kelvins). As such, the aperture can be adjusted to have the desired gain to accommodate the entirety of the RF link so the link can be established/closed. Accordingly, the desired gain may be achieved, and it is possible to vary the gain by dynamically adjusting aperture.

To electronically steer antenna elements, the RF back-end alters the phases and amplitudes of the signals sent to the RF front-end and, in some cases, applying space-time adaptive processing methods. That is, the antenna system has a feed network through which signals can be fed to the RF front-end for propagation to an external entity.

Different techniques are available to electronically steer/aim the beams. These techniques generally alter the signal phase and amplitude sent to the RF front-end. A first technique is the "multiple-input and multiple-output" ("MIMO") technique. MIMO is a method in which the capacity of an RF link is multiplied through the use of multiple transmit/receive antennas to thereby exploit multipath propagation. That is, MIMO can perform multipath off of different apertures to address problems when interferences occur as a result of using many different antenna arrays. In this regard, any number of signals can be sent or received simultaneously with each other over the same RF frequency/channel.

Another technique for aiming the antenna arrays/elements is referred to as orbital angular momentum multiplexing ("OAM"). OAM generally refers to a physical layer technique in which signals are multiplexed with one another on an electromagnetic wave, where the multiplexing occurs through the use of the orbital angular momentum of the electromagnetic wave. Such a process allows the electromagnetic wave to be distinguished from different orthogonal signals. In this regard, OAM generally relies on electron spin (at any scale) to steer an antenna. Because the RF components are embedded in a rotor blade, which spins, OAM can use electron spinning on top of the rotor blade spinning to focus an electromagnetic wave at a particular endpoint. OAM also provides enhanced diversity in signaling. Furthermore, because the signals can be orthogonal to one another, there is reduced (or even no) interference with each other. Consequently, it is possible to simultaneously stack an electromagnetic wave with numerous different channels, thereby achieving many different links out of the same electromagnetic signal/waveform.

Through these and any other steering technique, the disclosed embodiments are able to increase the link diversity available to the antenna network. By "link diversity," it is generally meant that many different types of RF communication links may be established, where the links span multiple different bands/frequencies and may be created simultaneously with one another. Diversity also generally relates to spatial diversity, polarization diversity, and frequency diversity.

Because antenna elements can now be located on a rotating rotor blade, these techniques additionally factor in the rotation speed of the rotor blade. That is, an n-dimensional moving body analysis/model may be performed to compensate for the rotation of the rotor blades. Because each element can be its own moving object or, alternatively, elements can operate in unison with one another, the antenna system can structure the n-dimensional moving body analysis/model to correlate to how the antenna elements are configured.

The phases and amplitudes of the signals can then be determined as a function of the rotor blade's rotation using this n-dimensional moving body model. In some embodiments, each part of the electromagnetic wave/beam (e.g., from each array element) is electronically steered to the external endpoint. This steering occurs at each frame as the antenna elements sweep around the central rotary hub so that when the signal reaches the endpoint, the signal is a full composite set of data/information. Dynamically adjusting the signals in this manner (e.g., by altering the phases and amplitudes) constitutes a "rotation compensation" and can be performed for any number of antenna elements embedded within any number of rotor blades.

By performing the rotation compensation, the antenna system is able to aim its electromagnetic beam and track to any desired target. Furthermore, the resulting beam can be formed to have characteristics analogous to those of traditional beams. Consequently, the receiver can operate without modification and without needing to know that the transmitted signal was sent using the improved techniques disclosed herein. In this regard, the embodiments are receiver and transmitter agnostic.

With these enhanced electronic steering techniques, the antenna system is also able to support low probability of detection (LPD), low probability of interference/intercept (LPI), anti-jamming, satellite interference, geo-location, cosite interference, position-navigation-timing (PNT), and geo-steering, even at wideband frequencies (and perform other operations at narrowband frequencies). Therefore, if the disclosed embodiments were implemented in a military-type rotary aircraft, then electronic warfare ("EW") may be performed. Briefly, and with regards to LPD or the other EW steering techniques, it is possible to adjust the antenna pattern's side lobes (e.g., side lobe 720 from FIG. 7B) to suppress gain in those areas (e.g., through the use of tapered antenna arrays). Such an operation allows for the ability to control the side lobes so it is possible to know who is seeing the signal and who is not. Additionally or alternatively, embodiments may be configured to shape signals to maintain a certain spectral flux density. The spectral flux density defines the amount of power per area at a given physical location. Embodiments can shape signals to limit the power transmitted to the given physical location, to limit the spectral flux density, to ensure that the signals provide LPD, LPI, geo-location, PNT, and so on.

In some situations, the tips of a rotor blade may actually flap to some extent (e.g., from turbulence). The rotor blades are generally made of flexible material, and they can flex slightly up and down depending on the speed. The disclosed steering techniques are able to identify when such flexing occurs (e.g., because the link strength may be increased or reduced or the link may be momentarily disconnected as a result of the aim shifting from the flapping) and take corrective measures to realign the electromagnetic wave with the target endpoint. Such corrective measures may be performed very quickly (e.g., a few nanoseconds), thereby preserving the strength of the link. As an example, suppose a pilot is using the antenna system to communicate with an endpoint. If the rotor blades flap or flex for some reason and the link momentarily goes out of focus, the steering can perform corrective measures so quickly that the pilot (or certain communication components) will not even realize that the link was out of focus. Consequently, the antenna arrays can be "snapped" back into place, almost instantaneously, via the electronic steering. In this regard, the disclosed embodiments, when performing electronic steering, can perform error correction as well as any type of compression or compensations to ensure that the RF communication link is as strong as possible throughout its duration.

Multiple Simultaneous Communication Links

Figure 8A:
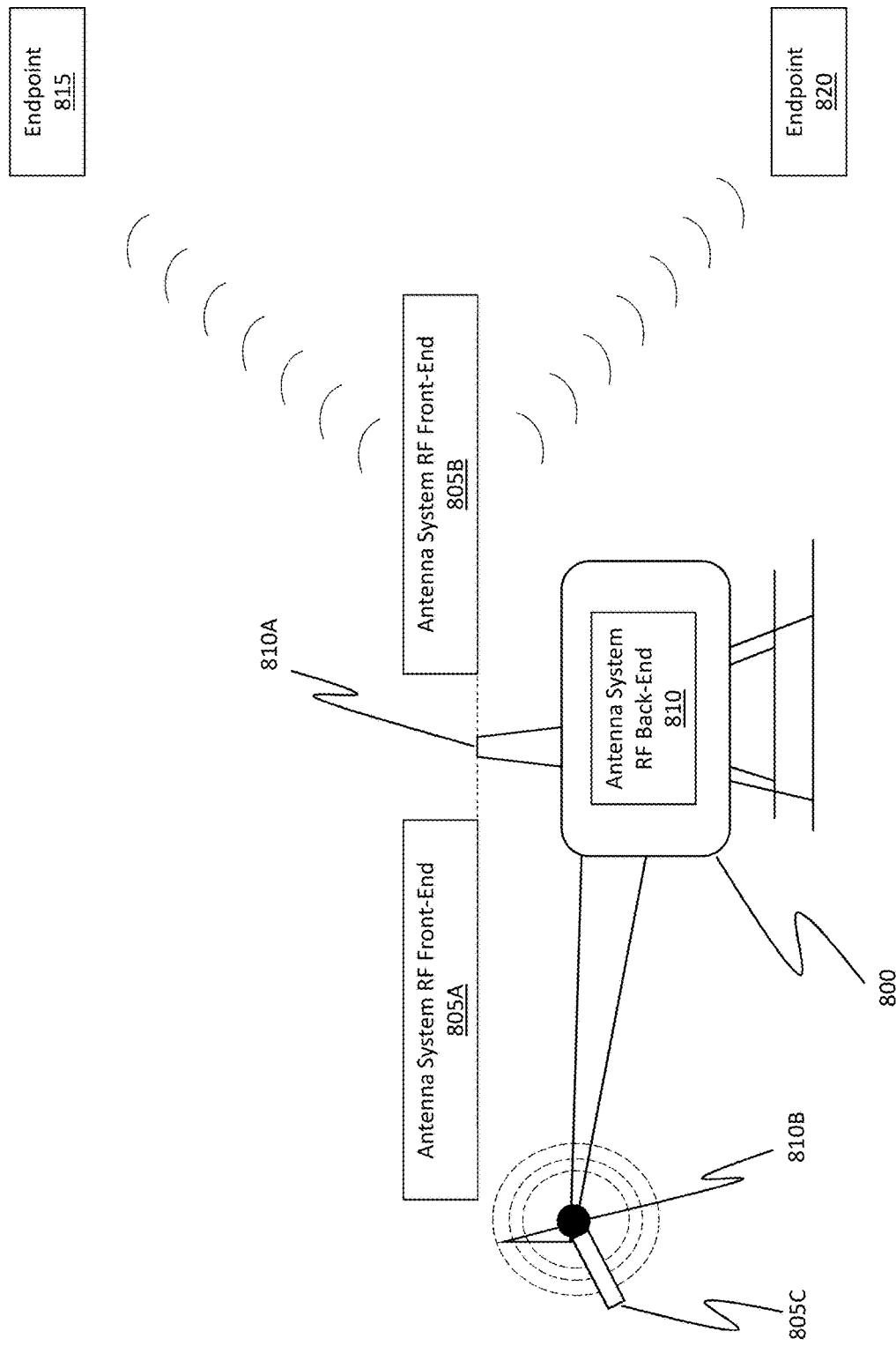
FIGS. 8A and 8B show one example of how an antenna system's RF front-end and RF back-end can be used to establish any number of simultaneously established wideband RF communication links.
Figure 8B:
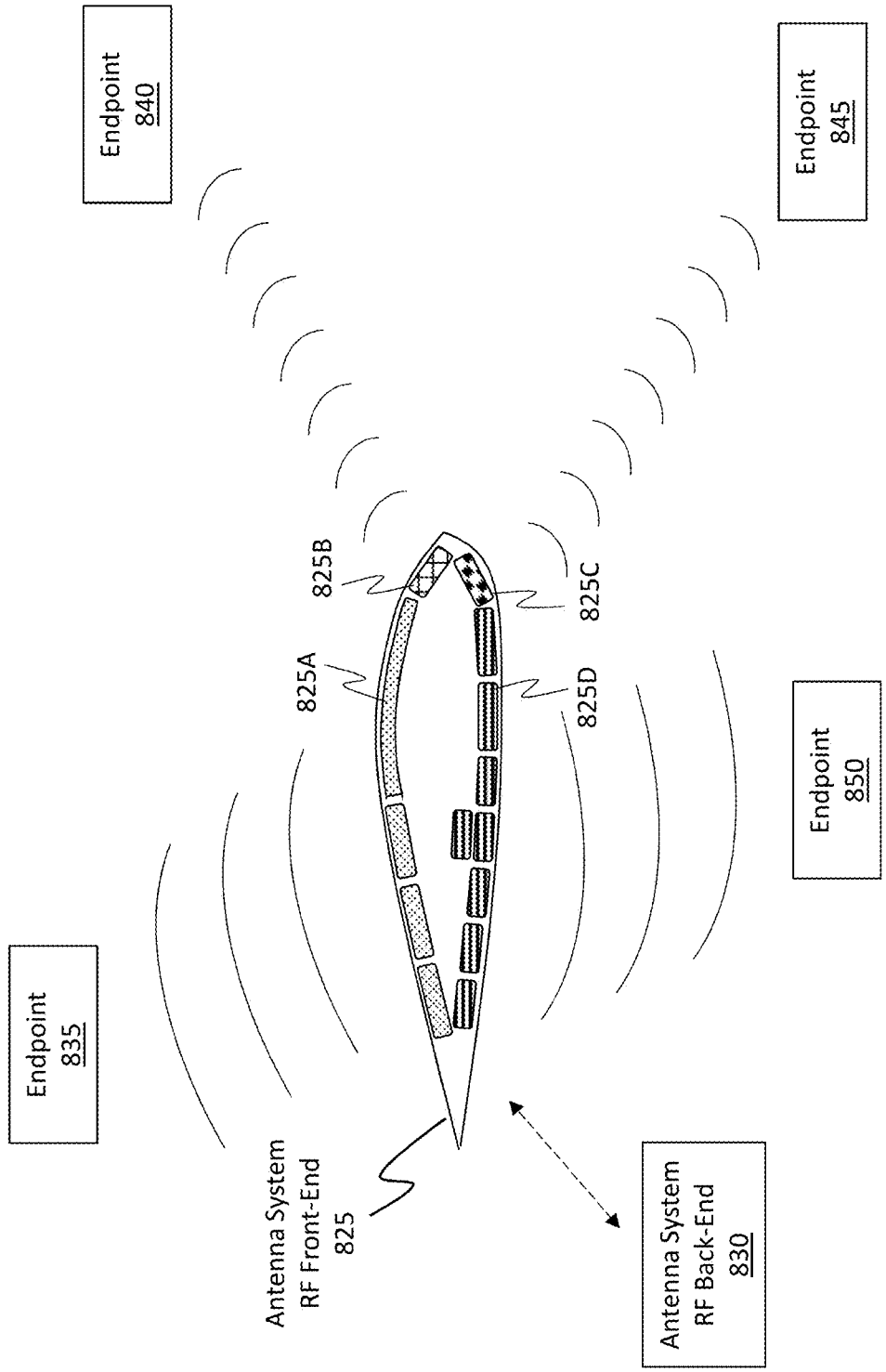

FIGS. 8A and 8B show some situations in which multiple instantaneous wideband RF links are established. In FIG. 8A, a rotary aircraft 800 is shown as including a RF front-end 805A on one rotor blade, a RF front-end 805B on another rotor blade, and RF front-end 805C on yet another rotor blade (this one being a tail rotor blade). RF front-ends 805A, 805B, and 805C are representative of any of the previously discussed RF front-ends in that they may include any number of RF components.

In this situation, the RF front-ends 805A, 805B, and 805C include multiple antenna arrays and multiple amplifiers, as shown in earlier figures. Each of the antenna arrays includes multiple antenna elements. Furthermore, RF front-end 805A includes a first set of antenna elements and amplifiers, which are embedded within an internal portion of the corresponding rotor blade, and RF front-end 805B includes a second set of antenna elements and amplifiers, which are also embedded within an internal portion of the corresponding rotor blade. RF front-end 805C will also have its own set of RF components.

Rotary aircraft 800 also includes a first rotary hub 810A and a second rotary hub 810B as well as a RF back-end 810. RF front-ends 805A and 805B are connected to the RF back-end 810 via the first rotary hub 810A while RF front-end 805C is connected to the RF back-end 810 via the second rotary hub 810B. The RF back-end 810 converts digital signals to analog signals or, alternatively, analog signals to digital signals. Accordingly, rotary aircraft 800 is equipped with an antenna/communications system that facilitates instantaneous mixed wideband RF communications.

In the scenario shown in FIG. 8A, RF front-end 805B is establishing at least two separate RF communication links, which are pointed at two separate target endpoints. To illustrate, the communications system is currently communicating with endpoint 815 and with endpoint 820. The embodiments are able to dynamically form any number of different arrays within each RF front-end 805A, 805B, and 805C. These antenna array beams can also be pointed at different locations/endpoints by electronically steering beams radiated from those antenna arrays.

In some embodiments, the process of dynamically forming the different antenna apertures and steering those apertures may be based on RF front-end availability and/or antenna element availability. For example, because endpoint 815 is to the front and slightly above rotary aircraft 800, a frontward and upward facing antenna element or array may be used to establish the RF communication link with endpoint 815. Similarly, because endpoint 820 is to the front and slightly below rotary aircraft 800, a frontward and downward facing antenna element or array may be used to establish the RF communication link with endpoint 820.

In addition to electronically steering antenna elements towards endpoints and to performing EW functionalities (e.g., satellite interference, LPD, LPI, etc.), the antenna system can also be configured to consider the safety of the pilot when electronically steering the radiated energy. For instance, the disclosed embodiments may generate or otherwise acquire a mapping of the rotary aircraft. Based on this mapping and based on the rotation speed and position of the rotor blades, the antenna system can refrain from radiating energy downward when the rotor antennas are pointed at the pilot or pointed into the crew cabin. If so desired, other portions of the rotary aircraft can also be avoided when emitting energy. It is also possible to control the antenna system to compensate for movements of the rotary aircraft, such as tilting movements, banking movements, or any other type of movement. Consequently, the electromagnetic energy emitted by the antenna system can be managed in a highly directional manner.

FIG. 8B shows a scenario where different antenna elements are being dynamically combined with other elements to create varying apertures for establishing RF communication links. Specifically, FIG. 8B shows a RF front-end 825, which has multiple different RF components, and a RF back-end 830. The RF front-end 825, the RF components, and the RF back-end 830 are representative of the front-ends, RF components, and RF-backends discussed previously.

Here, the RF components have been dynamically separated into four different groups, or rather arrays, such as, for example, array 825A, array 825B, array 825C, and array 825D. The different shading in FIG. 8B shows which RF components belong to which array. For instance, array 825A is shown as including four antenna elements, array 825B is shown as including only a single antenna element, array 825C is shown as including only a single antenna element, and array 825D is shown as including eight antenna elements. Of course, any number or combination of antenna elements may be used, and (e.g., in other scenarios where array groups are not formed) each one of the antenna elements may be independently biased. Consequently, in some embodiments, each element may be independently operable as an independent antenna unit. In some cases, groups of antenna elements (or even all of the elements) may be collectively controllable via electronic antenna steering such that multiple antenna elements are collectively operable as a single antenna unit.

Here, array 825A has established a RF communication link with endpoint 835. Array 825B has established a RF communication link with endpoint 840. Array 825C has established a RF communication link with endpoint 845. Finally, array 825D has established a RF communication link with endpoint 850. Consequently, any number of RF communication links may be established with any number of target endpoints.

Figure 9:
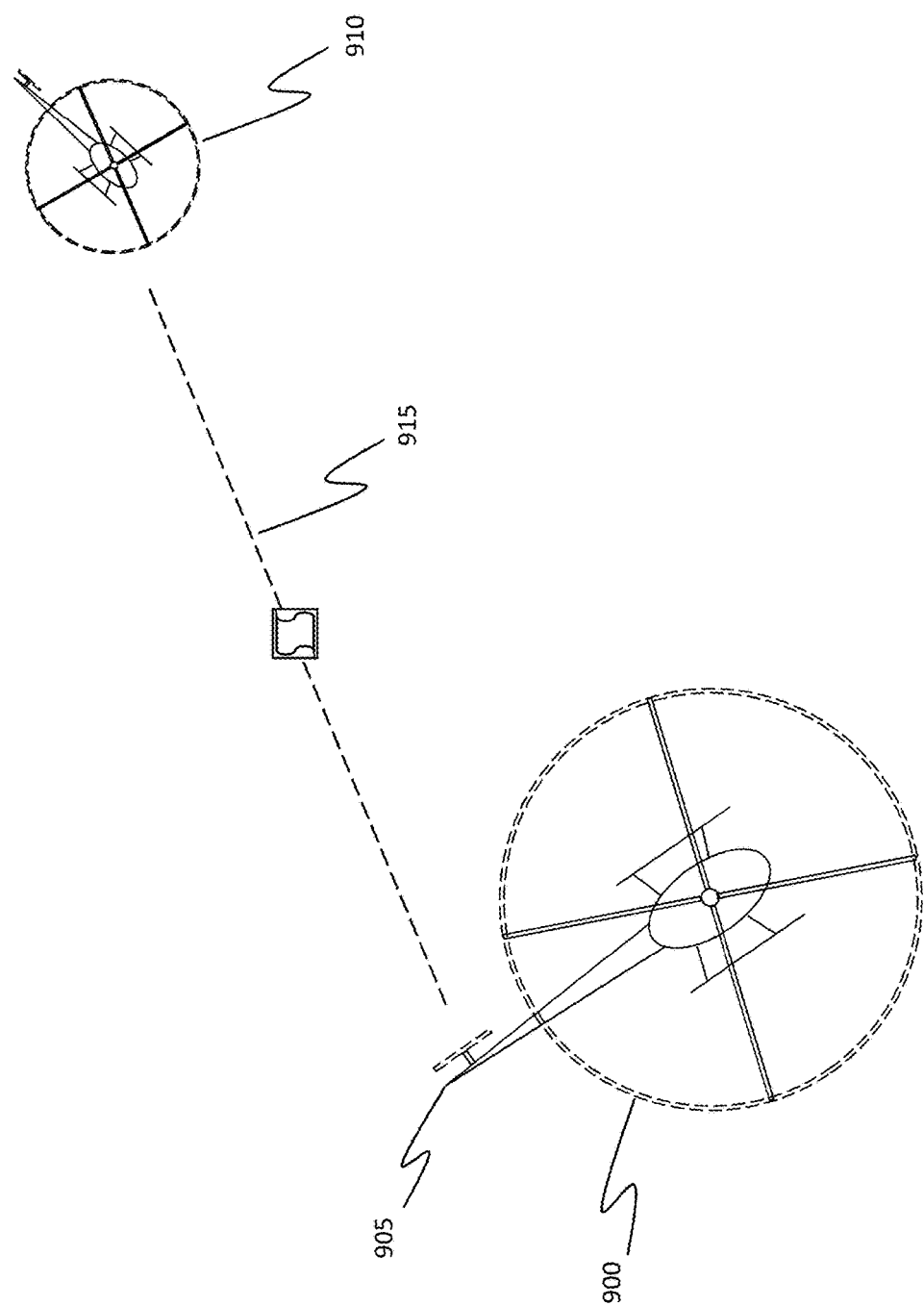
FIG. 9 illustrates how RF components may be embedded within any rotor blade of the rotary aircraft, even tail rotors (e.g., in a helicopter).

FIG. 9 shows a scenario that includes a rotary aircraft 900, which has a secondary rotor hub/blades 905, and another rotary aircraft 910. Here, the rotary aircraft 900 has established a RF communication link 915 using the RF components embedded in the secondary rotor hub/blades 905.

Figure 10:
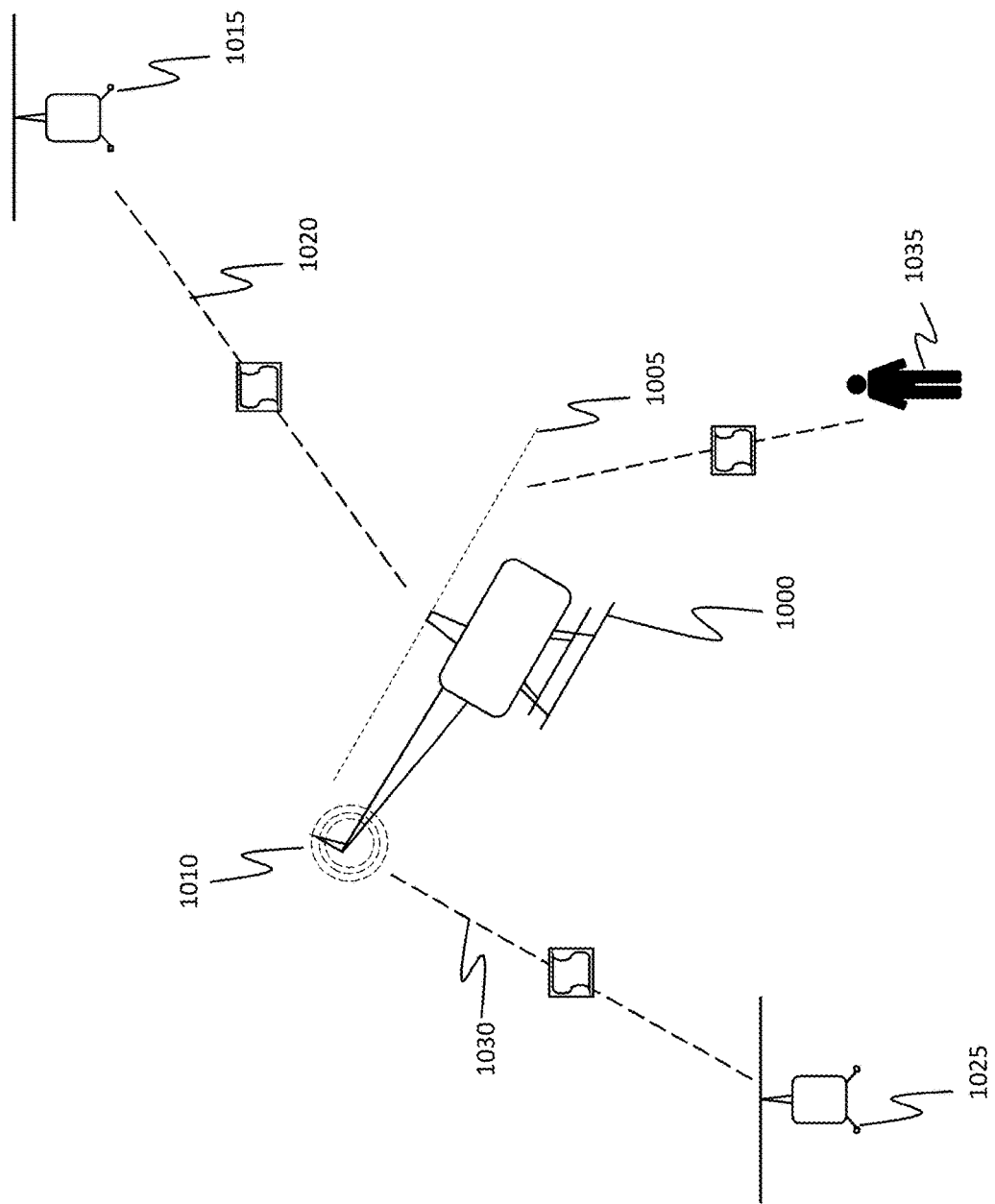
FIG. 10 illustrates how a rotary aircraft can use its different hubs and rotors to establish simultaneous wideband RF communication links with any number of different external receivers or transmitters.

FIG. 10 shows another scenario in which a rotary aircraft 1000, which includes a main rotor 1005 and a secondary rotor 1010, is communicating with other aircrafts. In particular, the RF components in the main rotor 1005 are being used to communicate with aircraft 1015 via RF communication link 1020. Concurrently with the establishment of RF communication link 1020, the RF components in the secondary rotor 1010 are being used to communicate with aircraft 1025 via RF communication link 1030. The system can also communicate with individuals, vehicles, or other entities on the ground, who are either stationary or on the move, as shown by the communication with person 1035 in FIG. 10. Accordingly, by embedding RF components in a rotary aircraft's rotor blades, the number and diversity of RF communication links may be greatly expanded and improved, even for air-to-ground links.

Example Methods

Figure 11A:
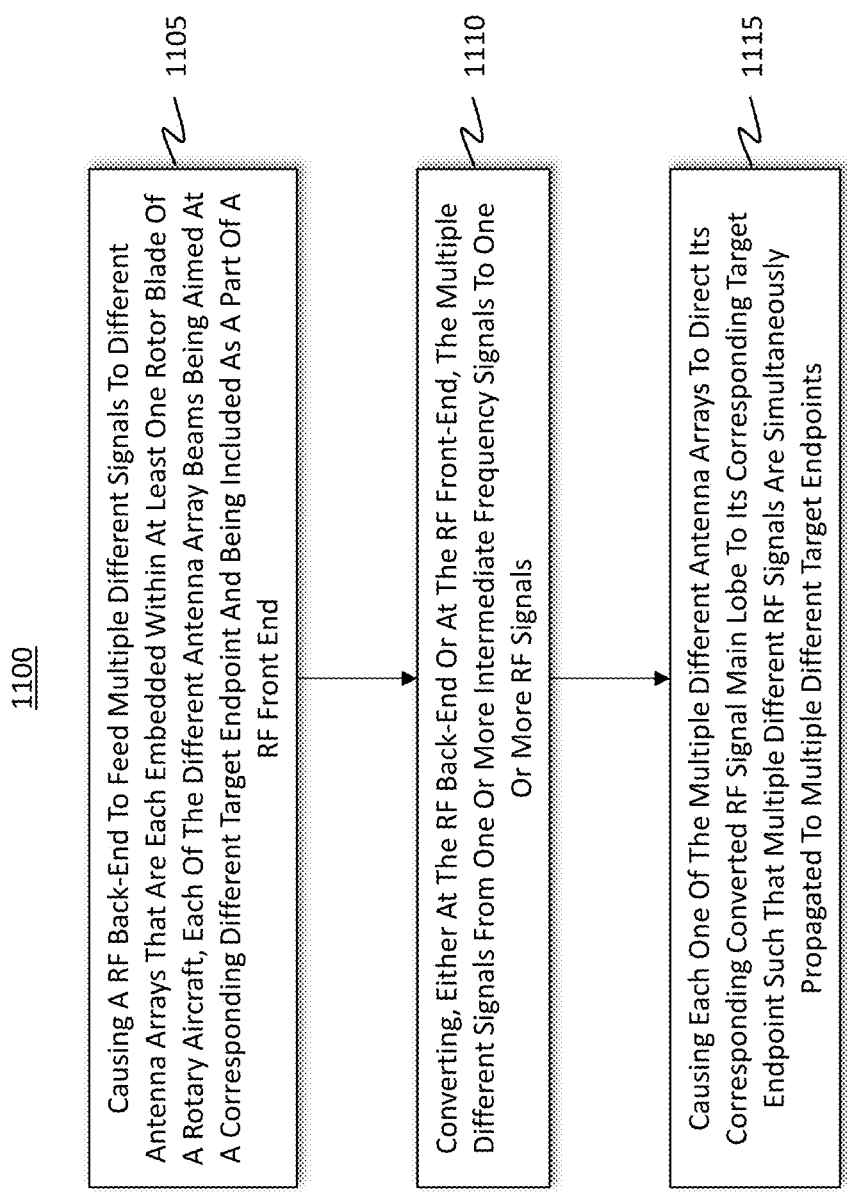
FIGS. 11A and 11B illustrate a flowchart of an example method for simultaneously propagating multiple different RF signals to multiple different target endpoints, where the signals are initially propagated into three-dimensional space from a rotary aircraft's rotor blades.
Figure 11B:
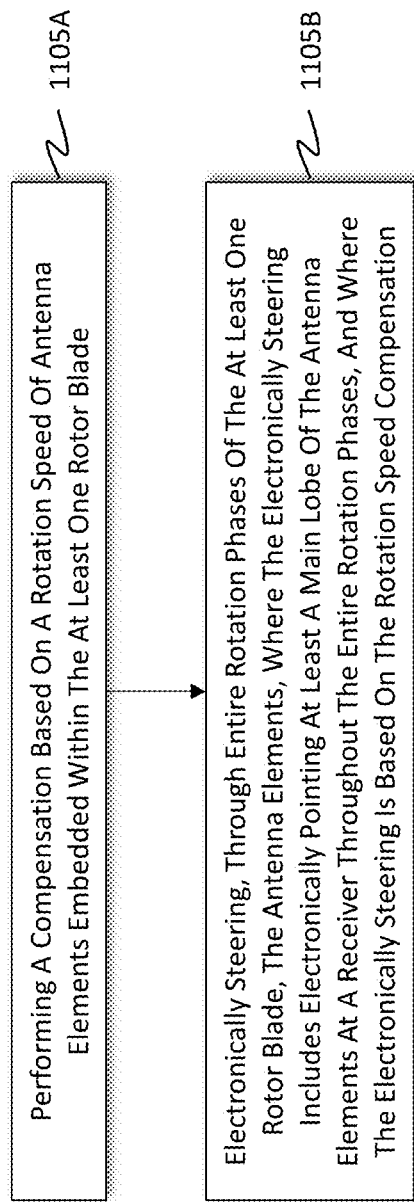

Attention will now be directed to FIGS. 11A and 11B which refer to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 11A shows a flowchart of an example method 1100 for controlling an antenna system, which includes a RF front-end and a RF back-end, of a rotary aircraft, where the RF front-end includes multiple different antenna arrays that are dispersed across multiple different rotor blades of the aircraft. As before, this rotary aircraft includes a central rotary hub and multiple rotor blades connected to the central rotary hub. Furthermore, this method is performed to simultaneously propagate multiple different RF signals to multiple different target endpoints.

Initially, method 1100 includes an act (act 1105) in which the RF back-end feeds multiple different signals to the different antenna arrays, where each antenna array transmits or receives a different signal to a different target endpoint (e.g., as shown in FIG. 8B). Stated differently, each antenna array beam is aimed at a corresponding different target endpoint. Furthermore, the RF front-end includes multiple differing types of RF components (e.g., antennas, amplifiers, mixers, etc.) such that the rotor blade has embedded therein multiple different types of RF components.

This process of feeding the multiple different signals to the RF front-end may be performed using any of the previously disclosed electronic steering techniques. Turning briefly to FIG. 11B, this figure further elaborates on some of the processes that may be followed to perform act 1105.

Specifically, FIG. 11B shows an act (act 1105A) of performing a compensation on how the different signals are fed to the RF front-end based on a rotation speed of the antenna elements/arrays that are embedded within the rotor blade. For example, as discussed earlier, the phases of the signals may be modified using the n-dimensional analysis/model in order to correct, or rather compensate, for the rotational aspect of the elements.

Additionally, FIG. 11B shows an act (act 1105B) of electronically steering, through the entire rotation phase of the rotor blade, at least a main lobe/beam of the antenna elements/arrays. Of course, any type of electronic steering may be utilized. Furthermore, this electronic steering process includes electronically pointing the main lobe of the antenna elements/arrays at a receiver throughout the entirety of the rotation phase. Even further, this steering may be based on the rotation speed compensation.

Returning to FIG. 11A, method 1100 also includes an act (act 1110) of performing a conversion, either at the RF back-end or at the RF front-end, on the multiple different signals that are fed to the multiple different antenna arrays disposed within the different rotor blades. This conversion includes converting the multiple different signals from one or more intermediate frequencies to one or more radio frequencies for signals that are to be transmitted to an external receiver (i.e. a target endpoint). For signals that are received from a transmitter, however, the conversion may include converting radio frequencies to intermediate frequencies.

Method 1100 then includes an act (act 1115) of causing each one of the multiple different antenna arrays to direct its corresponding converted RF signal main lobe to its corresponding target endpoint. These converted signals may be in the form of an electromagnetic wave, such as that shown in FIG. 2. Consequently, multiple different RF signals are simultaneously propagated to multiple different target endpoints. Furthermore, these RF signals are initially propagated from the rotary aircraft's rotor blades and then they are directed into three-dimensional space towards the different target endpoints Accordingly, by following the disclosed embodiments, significant technical improvements and advantages may be realized. That is, additional RF communication links may be established without substantially altering the weight of the rotary aircraft and without displacing other hardware parts that also need to be placed on the rotary aircraft. Furthermore, at least some of those links may be formed without having to factor in a rotor blade overhead shadow.

Example Computer System(s)

Figure 12:
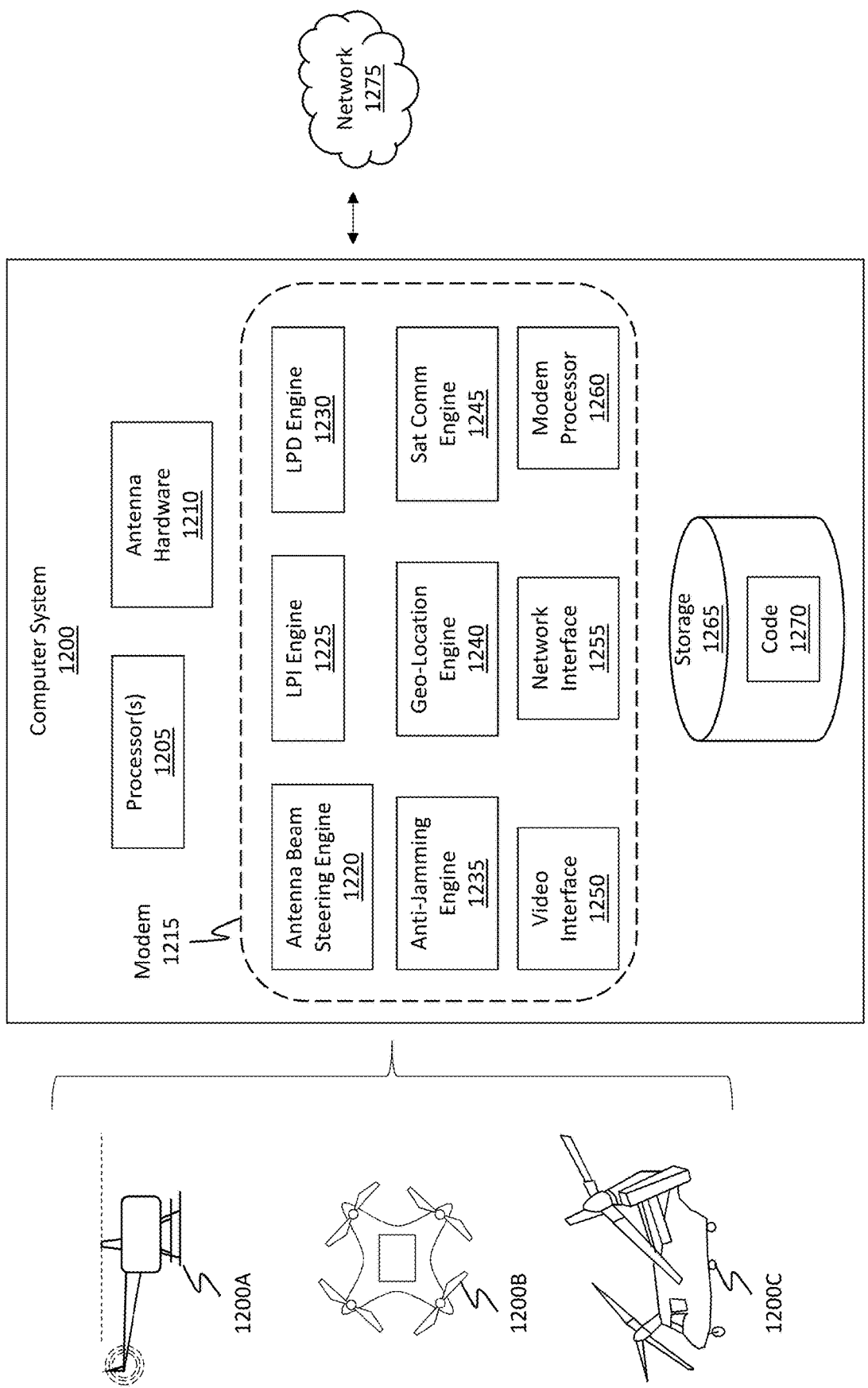
FIG. 12 illustrates an example computer system that may be used to perform any of the disclosed operations and that may be used to control the disclosed antenna/communication systems.

Attention will now be directed to FIG. 12 which illustrates an example computer system 1200 that may be used to facilitate the operations described herein. Computer system 1200 may be included in various different rotary aircrafts. For example, in FIG. 12, computer system 1200 may be included in a helicopter 1200A, a drone 1200B, or even a tilt wing (tilt-rotor) aircraft 1200C. While only three types of rotary aircraft are shown, it will be appreciated that computer system 1200 may be included in any type of rotary aircraft. In some implementations, computer system 1200 is included as a part of the antenna system's RF back-end.

In its most basic configuration, computer system 1200 includes various different components. For example, FIG. 12 shows that computer system 1200 includes at least one processor 1205 (aka a "hardware processing unit"), antenna hardware 1210 (e.g., any of the previously recited antennas, amplifiers, mixers, tuning unit, etc.), and a modem 1215. The modem 1215 includes an antenna beam steering engine 1220, LPI engine 1225, LPD engine 1230, anti-jamming engine 1235, geo-location engine 1240, sat comm engine 1245, a video interface 1250, a network interface 1255, and a modem processor 1260. Computer system 1200 also includes storage 1265.

As used herein, the term "executable module," "executable component," "engine," or even "component" can refer to software objects, routines, or methods that may be executed on computer system 1200. The different components, modules, engines, and services described herein may be implemented as objects or processors that execute on computer system 1200 (e.g. as separate threads). It will be appreciated that engines, modules, or components may be a combination of one or more processors and executable instructions that cause the processor(s) to perform specialized functions, such as those described throughout this disclosure and in particular with relation to each individual method act described in FIGS. 11A and 11B.

The antenna beam steering engine 1220 may be used to perform any of the disclosed electronic steering techniques (e.g., MIMO, OAM, etc.) The LPI engine 1225 may be used to perform the LPI techniques, similarly the LPD engine 1230 may be used to perform the LPD techniques. The anti-jamming engine 1235 performs anti-jamming, the geo-location engine 1240 performs geo-location, and the sat comm engine 1245 performs satellite interference and other types of satellite communications. The video interface 1250 is able to perform video transmissions. The network interface 1255 can be used to communicate with any type of network. The modem processor 1260 can be used to coordinate the activities of these other engines and/or to perform any other operation.

The storage 1265 may include computer-executable instructions in the form of code 1270. Storage 1265 may be physical system memory, which may be volatile, non-volatile, or some combination of the two. The term "memory" may also be used herein to refer to non-volatile mass storage such as physical storage media. If computer system 1200 is distributed, the processing, memory, and/or storage capability may be distributed as well.

In other instances, the components, modules, or engines may simply be executable instructions that are executable by any type of processor. In yet other instances, the components, modules, or engines, may be in the form of ASICs or even system-on-chip ("SOC") devices specially configured to perform any individual operation (e.g., any one act included in the methods from FIGS. 11A and 11B) or to perform multiple operations (e.g., any combination of the method acts from FIGS. 11A and 11B). In this regard, a component, module, or engine can be thought of as a hardware processing unit, a compilation of executable code, or combinations of the above that enable a computer system to perform specialized operations.

The disclosed embodiments may comprise or utilize a special-purpose or general-purpose computer including computer hardware, such as, for example, one or more processors (such as processor 1205) and system memory (such as storage 1265), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1200 may also be connected (via a wired or wireless connection) to external sensors (e.g., one or more remote cameras, accelerometers, gyroscopes, acoustic sensors, magnetometers, data acquisition systems, etc.). Further, computer system 1200 may also be connected through one or more wired or wireless networks 1275 to remote/separate computer systems(s) that are configured to perform any of the processing described with regard to computer system 1200. Additionally, by propagating an electromagnetic signal to a target endpoint, computer system 1200 can communicate wirelessly with other computer systems. Although not shown, computer system 1200 may also include any number of input/output ("I/O") devices (e.g., a display, keyboard, mouse, etc.) or modules/engines (display graphics or a graphics rendering engine) that may be configured, with processor 1205, to render one or more images for a user.

A "network," like the network 1275 shown in FIG. 12, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1200 will include one or more communication channels that are used to communicate with the network 1275. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

It will also be appreciated that computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 1205). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware. The disclosed embodiments also support waveform generation and modem functions.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. Furthermore, any of the disclosed features, processes, principles, or acts may be implemented individually or as a combination with any of the other disclosed principles.

What is claimed is:

1. An antenna system for facilitating narrowband and wideband radio frequency (RF) communications of a rotary aircraft, which includes a first central rotary hub and a plurality of rotor blades connected to the first central rotary hub, and a second rotary hub and a plurality of secondary rotor blades connected to the second rotary hub, the antenna system comprising:
   a RF front-end that includes a plurality of RF components structured to transmit and receive RF communications as electromagnetic waves into three-dimensional space, wherein the plurality of RF components form parts of at least one of said rotor blades and one of said secondary rotor blades, and wherein at least some of said RF components are of differing types such that the at least one rotor blade and the at least one secondary rotor blade include multiple different types of RF components; and
   a RF back-end connected to the RF front-end via the central rotary hub.

2. The antenna system of claim 1, wherein the plurality of RF components are embedded within an internal portion of the at least one rotor blade such that the plurality of RF components are not exposed to an external environment.

3. The antenna system of claim 1, wherein the plurality of RF components are configured to simultaneously establish multiple communication links.

4. The antenna system of claim 1, wherein:
   a first set of RF components from the plurality of RF components are physically disposed proximate to a dorsal surface of the at least one rotor blade,
   a second set of RF components from the plurality of RF components are physically disposed proximate to a ventral surface of the at least one rotor blade, and
   the ventral surface is an opposing surface to the dorsal surface.

5. The antenna system of claim 4, wherein:
   the first set of RF components disposed proximate to the dorsal surface are controlled simultaneously to and independently from the second set of RF components disposed proximate to the ventral surface, and
   the first set of RF components transmits or receives a first electromagnetic wave in an upward direction relative to the rotary aircraft while the second set of RF components simultaneously transmits or receives a second electromagnetic wave in a downward direction relative to the rotary aircraft.

6. The antenna system of claim 1, wherein:
   the differing types of RF components are embedded within an internal portion of the at least one rotor blade, and
   the differing types of RF components include:
      one or more antenna arrays, each comprising one or more corresponding antenna elements, and
      one or more RF amplifiers,
   whereby the at least one rotor blade includes at least one antenna array and at least one RF amplifier.

7. The antenna system of claim 6, wherein:
   the differing types of RF components embedded within the at least one rotor blade further include one or more mixers configured to convert RF signals to intermediate frequency (IF) signals or IF signals to RF signals, and
   the one or more antenna arrays, which are embedded within the internal portion of the at least one rotor blade, comprises one or more of:
      tapered Vivaldi antenna arrays,
      staggered patch antenna arrays, or
      linear circular polarization antenna arrays.

8. The antenna system of claim 6, wherein each one of the one or more antenna elements, which are embedded within the internal portion of the at least one rotor blade, is independently signal sourced such that each one of the one or more antenna elements is independently operable as an independent antenna unit.

9. The antenna system of claim 6, wherein:
   the one or more antenna elements, which are embedded within the internal portion of the at least one rotor blade, include multiple antenna elements, and
   the multiple antenna elements are collectively controllable via electronic antenna steering such that the multiple antenna elements are collectively operable as a single antenna unit.

10. A communications system for facilitating radio frequency (RF) communications, which includes narrowband and/or wideband signals, of a rotary aircraft, which includes a central rotary hub and a plurality of rotor blades connected to the central rotary hub, the communications system comprising:
   a RF front-end that includes a plurality of antenna arrays and a plurality of amplifiers, wherein:
      each antenna array in the plurality of antenna arrays includes multiple antenna elements,
      a first set of antenna elements and amplifiers are embedded within an internal portion of a first rotor blade included among the plurality of rotor blades, and
      a second set of antenna elements and amplifiers are embedded within an internal portion of a second rotor blade included among the plurality of rotor blades, and
   a RF back-end connected to the RF front-end via the central rotary hub, wherein the RF back-end at least converts digital signals to analog signals or, alternatively, analog signals to digital signals.

11. The communications system of claim 10, wherein at least some antenna elements included in the first set of antenna elements and amplifiers are at least partially shaped to conform to a shape of the first rotor blade.

12. The communications system of claim 10, wherein the RF back-end and the RF front-end, which includes the first set of antenna elements and amplifiers embedded within the first rotor blade and the second set of antenna elements and amplifiers embedded within the second rotor blade, together are configured to perform one or more of the following:

low probability of detection (LPD) for the RF communications, low probability of intercept (LPI) for the RF communications, anti-jamming for the RF communications, or geo-location for the RF communications.

13. The communications system of claim 10, wherein:

the RF back-end and the RF front-end, which includes the first set of antenna elements and amplifiers embedded within the first rotor blade and the second set of antenna elements and amplifiers embedded within the second rotor blade, together are configured to transmit or receive the RF communications, and the RF communications span one or more of the following bands:
L-band,
S-band,
C-band,
Ku-band,
Ka-band, or
higher than 40 GHz up to 90 GHz.

14. The communications system of claim 10, wherein:

the plurality of antenna arrays include wide-band antenna arrays, and the wide-band antenna arrays are structured to perform satellite interference mitigation on one or more side lobes of antenna patterns of the wide-band antennas.

15. A method for simultaneously propagating multiple different radio frequency (RF) signals to multiple different target endpoints, the multiple different RF signals being propagated by multiple different antenna arrays included in a RF front-end of an antenna system that also includes a RF back-end and that is included as a part of a rotary aircraft, which includes a central rotary hub and a plurality of rotor blades connected to the central rotary hub, where the plurality of rotor blades include a plurality of differing types of RF components, the method comprising:

causing the RF back-end to simultaneously feed multiple different signals to different antenna arrays that are each embedded within a different rotor blade of the rotary aircraft, wherein each of the different antenna arrays is aimed at a corresponding different target endpoint;

converting, either at the RF back-end or at the RF front-end, the multiple different signals from one or more intermediate frequencies to one or more radio frequencies, and causing each one of the different antenna arrays to direct its corresponding converted RF signal to its corresponding target endpoint such that multiple different RF signals are simultaneously propagated to multiple different target endpoints and such that the multiple different RF signals are initially propagated to the multiple different target endpoints from the rotor blades of the rotary aircraft.

16. The method of claim 15, wherein the method further includes:

electronically steering each one of the different antenna arrays independently of one another.

17. The method of claim 15, wherein the multiple different RF signals include both a voice signal and a video signal.

18. The method of claim 15, wherein the rotary aircraft is a helicopter, a drone, or a tilt-rotor aircraft.

19. The method of claim 15, wherein the method further includes:

performing a compensation on the multiple different signals, wherein the compensation is based on a rotation speed of the different antenna arrays, and electronically steering, through multiple entire rotation phases of the rotor blades, the different antenna arrays.

* * * * *